(12) United States Patent
Pajel et al.

(10) Patent No.: US 9,849,637 B2
(45) Date of Patent: Dec. 26, 2017

(54) SELF-CENTERING SEALANT APPLICATOR

(71) Applicant: The Boeing Company, Chicago, IL (US)

(72) Inventors: Carissa Ann Pajel, Mill Creek, WA (US); Robert Marshall Burgess, Seattle, WA (US); Benjamin Priest Hargrave, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 710 days.

(21) Appl. No.: 14/060,140

(22) Filed: Oct. 22, 2013

(65) Prior Publication Data

US 2015/0108685 A1    Apr. 23, 2015

(51) Int. Cl.
| | | |
|---|---|---|
| *B29C 45/14* | (2006.01) | |
| *B29C 70/68* | (2006.01) | |
| *B05C 5/02* | (2006.01) | |
| *B05C 11/10* | (2006.01) | |
| *B05C 17/00* | (2006.01) | |

(Continued)

(52) U.S. Cl.
CPC ............ *B29C 70/681* (2013.01); *B05C 5/022* (2013.01); *B05C 11/1021* (2013.01); *B05C 17/00* (2013.01); *B05C 17/002* (2013.01); *B25J 11/0075* (2013.01); *B29C 45/14065* (2013.01); *B29C 45/14336* (2013.01); *B29C 47/0023* (2013.01); *B05C 5/0212* (2013.01); *B29C 45/036* (2013.01); *B29L 2031/3076* (2013.01); *F16B 33/004* (2013.01); *F16B 37/14* (2013.01); *F16B 37/145* (2013.01)

(58) Field of Classification Search
CPC .... F16B 33/004; F16B 33/0061; F16B 37/14; F16B 37/145; B29C 70/681; B29C 47/0023; B29C 45/14065; B29C 45/14336; B29C 45/036; B05C 5/022; B05C 11/1021; B05C 17/00; B05C 17/002; B05C 5/0212; B29L 2031/3076
USPC .......................................................... 425/117
See application file for complete search history.

(56) References Cited

U.S. PATENT DOCUMENTS

| | | | | |
|---|---|---|---|---|
| 4,144,625 | A | 3/1979 | Hogenhout | |
| 4,519,974 | A * | 5/1985 | Bravenec | B29C 39/10 249/117 |

(Continued)

FOREIGN PATENT DOCUMENTS

| | | | | |
|---|---|---|---|---|
| EP | 0181483 | A1 | 5/1986 | |
| EP | 2492550 | A1 * | 8/2012 | ............ B64F 5/0009 |

(Continued)

OTHER PUBLICATIONS

Extended European Search Report, dated May 7, 2015, regarding Application No. EP14178924.8, 7 pages.

*Primary Examiner* — Seyed Masoud Malekzadeh
(74) *Attorney, Agent, or Firm* — Yee & Associates, P.C.

(57) ABSTRACT

A method and apparatus for applying sealant. The apparatus may comprise a shaping portion, a centering portion, and a support system. The shaping portion may have a cavity configured to receive a fastener system and receive a sealant. The centering portion may have a channel configured to position the shaping portion in a desired position around the fastener system when the fastener system is received in the cavity. The support system may be configured to maintain the desired position of the apparatus.

15 Claims, 28 Drawing Sheets

(51) Int. Cl.
    *B25J 11/00*     (2006.01)
    *B29C 47/00*     (2006.01)
    *F16B 33/00*     (2006.01)
    *F16B 37/14*     (2006.01)
    *B29L 31/30*     (2006.01)
    *B29C 45/03*     (2006.01)

(56) References Cited

U.S. PATENT DOCUMENTS

| | | | | |
|---|---|---|---|---|
| 4,971,745 | A * | 11/1990 | Ferenc | B29C 45/14336 264/263 |
| 5,322,381 | A | 6/1994 | Argo, II | |
| 5,593,120 | A * | 1/1997 | Hamerski | B29C 65/0672 156/235 |
| 8,303,285 | B2 | 11/2012 | Bradley | |
| 2009/0217868 | A1 * | 9/2009 | Caseteuble | B05B 15/0216 118/300 |
| 2011/0024943 | A1 * | 2/2011 | Kelley | B05C 11/1002 264/263 |
| 2012/0217673 | A1 * | 8/2012 | Hutter, III | B29C 33/00 264/219 |
| 2012/0219380 | A1 * | 8/2012 | Hutter, III | F16B 37/14 411/377 |
| 2013/0043351 | A1 | 2/2013 | Kamihara et al. | |

FOREIGN PATENT DOCUMENTS

| | | | | |
|---|---|---|---|---|
| FR | 2626629 | A1 * | 8/1989 | B29C 70/885 |
| FR | 2971719 | A1 * | 8/2012 | B64F 5/0009 |
| WO | WO2013154773 | A1 | 10/2013 | |

* cited by examiner

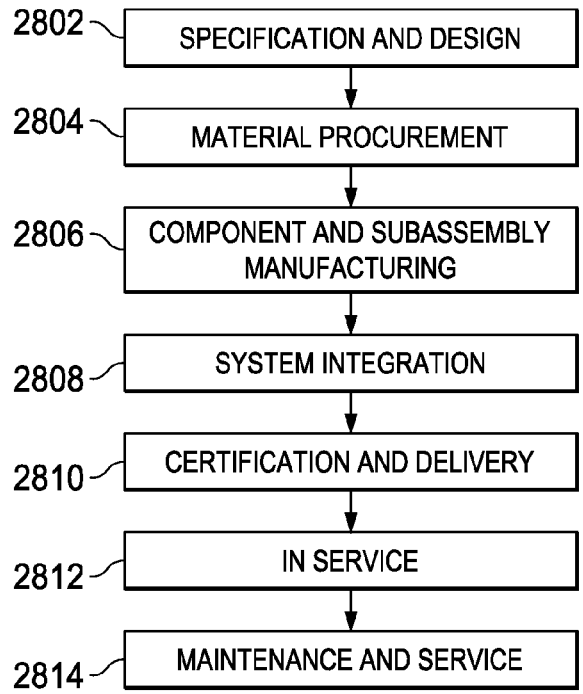
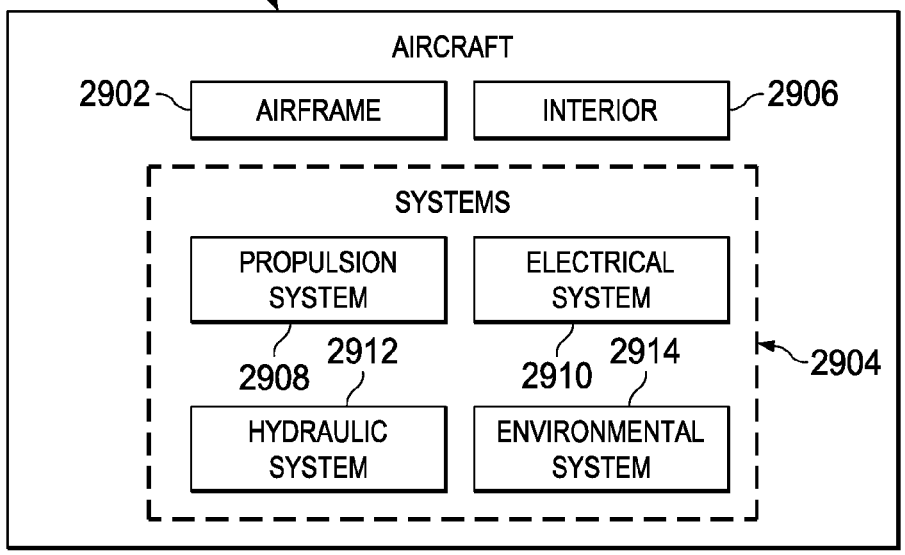

SELF-CENTERING SEALANT APPLICATOR

BACKGROUND INFORMATION

1. Field

The present disclosure relates generally to applying a coating to objects and, in particular, to applying sealant to objects. Still more particularly, the present disclosure relates to a method and apparatus for applying sealant to a fastener system with a self-centering sealant applicator.

2. Background

With manufacturing objects, a layer of sealant may be applied to each object to protect the object from various environmental effects. The layer of sealant may be used to cover and seal fasteners in a fastener system such as, for example, without limitation, screws and bolts. In some cases, sealant may be applied to a fastener to lower the risk of corrosion or electromagnetic effects.

Typically, a layer of sealant may cover a fastener by placing the sealant within a cap and then placing the cap over the head of the fastener. This cap may be associated with a sealant cartridge to form a sealant applicator. In some cases, the sealant applicator may be referred to as a dauber. The sealant applicator may be conducted by a human operator in some situations.

During installation, the cap and the sealant may be pressed down over the fastener to ensure that the sealant adheres to and covers the fastener to form a layer. The cap may then be removed from the fastener. However, often times, sealant may be applied unevenly around the fastener. In other cases, excess sealant may squeeze out from under the cap when the cap and the sealant are placed over the fastener and pressed downward.

An uneven or excess application of the sealant may be undesirable. For example, without limitation, unevenly applied or excess sealant may not meet manufacturing safety or quality standards provided by manufacturers, the government, or other organizations. As an example, a specified thickness for the layer of sealant may be desired over the fastener to meet safety standards for the object.

With some currently available methods for applying sealant, the thickness of the sealant over the fastener may be uneven, resulting in a fastener that does not meet manufacturing standards. Fasteners that do not meet these standards may need to be discarded or reworked. This process may be more time-consuming or expensive than desired.

When an object comprises multiple fasteners over which a layer of sealant is to be formed, the time needed to measure and rework fasteners may increase production times for the object, cost of the object, or both more than desired. Accordingly, there is a need for a method and apparatus which take into account one or more of the issues discussed above as well as possibly other issues.

SUMMARY

In one illustrative example, an apparatus may comprise a shaping portion, a centering portion, and a support system. The shaping portion may have a cavity configured to receive a fastener system and receive a sealant. The centering portion may have a channel configured to position the shaping portion in a desired position around the fastener system when the fastener system is received in the cavity. The support system may be configured to maintain a desired position of the apparatus.

In another illustrative example, a method for applying sealant may be provided. A fastener system may be received in a channel of a centering portion of a sealant applicator such that a shaping portion of the sealant applicator may be positioned in a desired position around the fastener system. The shaping portion may be held in the desired position. A layer of sealant may be formed over the fastener system.

In yet another illustrative example, an apparatus may comprise a shaping portion having a cavity and a number of interlocking sections having uniform dimensions, a centering portion, and a support system. The shaping portion may be configured to move independently of other interlocking sections. The shaping portion may be further configured to receive a fastener system within the cavity. The shaping portion may be further configured to receive a sealant within the cavity to form a layer of sealant over the fastener system having a uniform thickness. The centering portion may be moveably located within the cavity of the shaping portion. The centering portion may have a channel and an interlocking base section. The centering portion may be configured to position the shaping portion in a desired position around the fastener system when the fastener system is received in the cavity. The centering portion may be further configured to move between an extended position and a retracted position such that the shaping portion may be in the desired position around the fastener system when the centering portion is in the extended position. The centering portion may move along an axis extending centrally through the fastener system when moving between the extended position and the retracted position. The centering portion may be still further configured to receive the fastener system in the channel when in the extended position and move the fastener system out of the channel when in the retracted position. The interlocking base section may be configured to engage with an inner surface in the cavity of the shaping portion when the centering portion is in the retracted position. The centering portion may be further configured to deliver the sealant into the cavity of the shaping portion when the cavity portion is in the retracted position. The support system may be physically associated with the shaping portion and the centering portion, selected from at least one of a vacuum sealing device, a magnet clamping system, a lock, a clip, a track, a mechanical relative position location device, or a robotic arm. The support system may comprise a number of support elements configured to secure the number of support elements to a surface of an object in which the fastener system is installed. The support system may be configured to hold the apparatus in the desired position when the centering portion and the shaping portion retract to form the layer of sealant over the fastener. The support system may be further configured to maintain the desired position of the centering portion as the centering portion moves between the extended position and the retracted position. The support system may be still further configured to maintain the desired position of the shaping portion as the shaping portion is removed from the fastener system. The shaping portion, the centering portion, and the support system may form one of a sealant applicator or an automatic sealant applicator.

In still another illustrative example, a method for applying sealant may be provided. A fastener system may be received in a cavity of a shaping portion of a sealant applicator. A centering portion of the sealant applicator may be extended along an axis extending centrally through the fastener system. The centering portion may be configured to move between an extended position and a retracted position. The fastener system may be received in a channel of the centering portion when the centering portion is in the extended position such that the shaping portion is positioned in a desired position around the fastener system. The shaping portion may be held in the desired position using a support system such that a number of support elements of the shaping portion may maintain a desired position of the apparatus relative to a surface. The centering portion may be retracted along the axis such that an interlocking base section of the centering portion engages with an inner surface of the shaping portion. A sealant may be delivered into the cavity of the shaping portion of the sealant applicator to form a layer of sealant over the fastener system. The layer of sealant may have a uniform thickness.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 28 is an illustration of a block diagram of an aircraft manufacturing and service method in accordance with an illustrative embodiment; and FIG. 29 is an illustration of a block diagram of an aircraft in which an illustrative embodiment may be implemented.

DETAILED DESCRIPTION

The illustrative embodiments recognize and take into account one or more different considerations. For example, without limitation, the illustrative embodiments recognize and take into account that it may be desirable to have a method and apparatus for applying a layer of sealant to a fastener that reduces the overall time needed to apply sealant to a fastener system. The illustrative embodiments also recognize and take into account that it may be desirable to have a tool that may be configured to apply the layer of sealant over the fastener such that the layer of sealant may be of a specified amount, a specified thickness, or both, on the fastener.

Additionally, the illustrative embodiments recognize and take into account that when removing the tool from the fastener, it may be desirable to remove the tool from the fastener such that the configuration of the sealant remains substantially in place relative to the fastener. The illustrative embodiments further recognize and take into account that it may be desirable to apply the layer of sealant to the fastener without excess sealant around the base of the fastener.

Thus, the illustrative embodiments may provide a method and apparatus for applying a sealant to a fastener system. In one illustrative embodiment, a sealant applicator may comprise a shaping portion, a centering portion, and a support system. The shaping portion may have a cavity and may be configured to receive a fastener system. The shaping portion may be further configured to receive a sealant within the cavity to form a layer of sealant over the fastener system within the cavity. The centering portion may be moveably located within the cavity of the shaping portion and may have a channel. The centering portion may be configured to position the shaping portion in a desired position around the fastener system when the fastener system is received in the cavity. The centering portion may be further configured to deliver the sealant into the cavity of the shaping portion. The support system may be physically associated with the shaping portion. The support system may be configured to hold the shaping portion in the desired position when the sealant flows into the cavity to form the layer of sealant.

Figure 1:
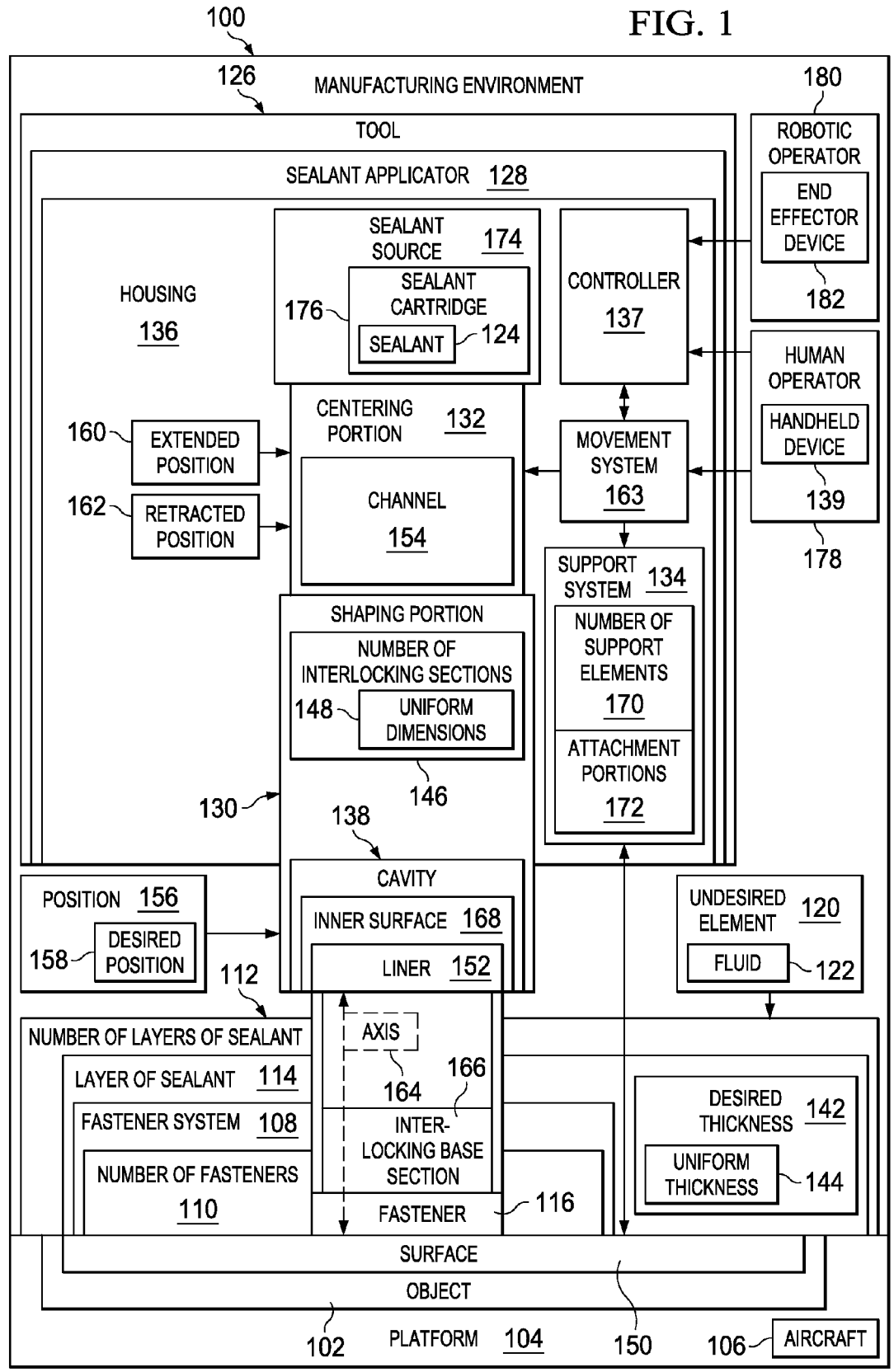
FIG. 1 is an illustration of a block diagram of a manufacturing environment in accordance with an illustrative embodiment.

Referring now to the figures and, in particular, with reference to FIG. 1, an illustration of a block diagram of a manufacturing environment is depicted in accordance with an illustrative embodiment. Manufacturing environment 100 may be an example of one environment in which object 102 may be formed.

In the illustrative example, object 102 may take a number of different forms. For example, without limitation, object 102 may be selected from one of a wing box, a spar assembly, a fuselage section, a structural frame, an engine housing, or some other suitable type of object.

As depicted, object 102 may be physically associated with platform 104. Platform 104 may be aircraft 106 in the illustrative example.

When one component is "physically associated" with another component, the association may be a physical association in the depicted examples. For example, without limitation, a first component, object 102, may be considered to be physically associated with a second component, platform 104, by being secured to the second component, bonded to the second component, mounted to the second component, welded to the second component, fastened to the second component, and/or connected to the second component in some other suitable manner. The first component also may be connected to the second component using a third component. The first component may also be considered to be physically associated with the second component by being formed as part of the second component, an extension of the second component, or both.

Object 102 may be assembled using fastener system 108. As depicted, fastener system 108 may include number of fasteners 110. As used herein, a "number of" items may include one or more items. In this manner, number of fasteners 110 may include one or more fasteners. Number of fasteners 110 may include at least one of a screw, a bolt, a pin, a clamp, a tie, a clip, a threaded nut, a crimped or swaged collar, or some other suitable type of fastener. One or more of number of fasteners 110 also may be associated with, for example, without limitation, one or more washers, spacers, or other suitable components as part of fastener system 108.

As used herein, the phrase "at least one of," when used with a list of items, may mean different combinations of one or more of the listed items may be used and only one of each item in the list may be needed. The item may be a particular object, thing, or category. In other words, "at least one of" may mean any combination of items and number of items may be used from the list, but not all of the items in the list may be required.

For example, without limitation, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

In this illustrative example, number of layers of sealant 112 may cover, seal, or cover and seal number of fasteners 110. In particular, a layer of sealant in number of layers of sealant 112 may cover corresponding fasteners in number of fasteners 110. As one illustrative example, layer of sealant 114 may cover and seal fastener 116.

Layer of sealant 114 may protect fastener 116, object 102, or both from undesired element 120. Undesired element 120 may be one of electricity, heat, fluid, dirt particles, or other types of elements. For example, without limitation, layer of sealant 114 may reduce the possibility of fluid 122 passing through the interface between fastener 116 and object 102.

In other illustrative examples, layer of sealant 114 may reduce the possibility of other materials such as a fuel, water, or other corrosive elements, liquid or gaseous, from passing through the interface between fastener 116 and object 102. In other words, layer of sealant 114 may form a barrier. Additionally, layer of sealant 114 may also be used to reduce or substantially prevent undesired effects resulting from electromagnetic events.

In one illustrative example, layer of sealant 114 may be formed over fastener 116 by applying sealant 124 to fastener 116 using tool 126. Tool 126 may be sealant applicator 128 in this illustrative example.

As depicted, sealant 124 may be comprised of a number of different materials. For example, without limitation, sealant 124 may be comprised of at least one of a silicone material, a rubber material, a polymer, nylon, plastic, or some other suitable type of material.

In this depicted example, sealant applicator 128 may include shaping portion 130, centering portion 132, and support system 134. Sealant applicator 128 also may include housing 136. Housing 136 may be physically associated with at least one of shaping portion 130, centering portion 132, or support system 134 in some illustrative examples. In particular, housing 136 may contain one or more of these components.

When housing 136 is present, housing 136 may include components for automatic application of sealant 124 to form layer of sealant 114. For example, housing 136 of sealant applicator 128 may include controller 137 configured to move any of shaping portion 130, centering portion 132, or support system 134. In this case, sealant applicator 128 may be an automatic sealant applicator.

In this illustrative example, controller 137 may include programming for dispensing sealant 124 from sealant applicator 128. Controller 137 may be hardware in this illustrative example, but may include firmware or software in other illustrative examples.

In another example, housing 136 may be absent. Instead, handheld device 139 may be present. In this case, handheld device 139 may be physically associated with at least one of shaping portion 130, centering portion 132, or support system 134 in some illustrative examples.

Handheld device 139 may be selected from one of a handle, a grip, a button, a trigger, or some other suitable type of handheld device. Handheld device 139 may provide for manual application of sealant 124 to form layer of sealant 114. In particular, handheld device 139 may cause sealant 124 to be dispensed over fastener 116. In some examples, handheld device 139 may move one of shaping portion 130, centering portion 132, and support system 134. In some examples, controller 137 also may be associated with handheld device 139 to move one or more of shaping portion 130, centering portion 132, and support system 134.

In the illustrative example, shaping portion 130, centering portion 132, and support system 134 may include a number of different materials. For example, without limitation, one or more of shaping portion 130, centering portion 132, and support system 134 may include a metal, a metal alloy, a composite polymer, plastic, or other suitable materials. Shaping portion 130, centering portion 132, and support system 134 may comprise the same or different materials in the illustrative example.

As depicted, shaping portion 130 may have cavity 138 configured to receive fastener system 108. In particular, cavity 138 in shaping portion 130 may be configured to receive fastener 116. Shaping portion 130 may also be configured to receive sealant 124 to form layer of sealant 114 over fastener 116 within cavity 138.

As illustrated, shaping portion 130 may be configured to cause sealant 124 to form layer of sealant 114 over fastener 116 having desired thickness 142. Desired thickness 142 may be uniform thickness 144. Uniform thickness 144 may be substantially uniform within desired tolerances in this illustrative example.

In other illustrative examples, desired thickness 142 may be selected to meet specified manufacturing standards, to use a desired amount of sealant 124, or for other reasons. In other words, depending on the particular implementation, desired thickness 142 may not be uniform thickness 144. In some cases, desired thickness 142 may vary over layer of sealant 114.

Cavity 138 in shaping portion 130 may be a variety of different shapes. For example, without limitation, shaping portion 130 may have a hexagonal shape, an octagonal shape, a cylindrical shape, a dome shape, or other suitable types of shapes.

Layer of sealant 114 with desired thickness 142 over fastener 116 may be substantially the same shape as cavity 138 in shaping portion 130. In other words, as sealant 124 flows into cavity 138, sealant 124 takes the form of cavity 138 in shaping portion 130. For example, without limitation, if cavity 138 in shaping portion 130 has a dome shape, layer of sealant 114 over fastener 116 may also have a dome shape. In this manner, layer of sealant 114 may have various shapes depending on the shape of cavity 138 in shaping portion 130.

In some illustrative examples, shaping portion 130 may include number of interlocking sections 146. Each one of number of interlocking sections 146 may have uniform dimensions 148. Uniform dimensions 148 may be substantially uniform within desired tolerances in this illustrative example. In other illustrative examples, one or more of number of interlocking sections 146 may include sections with dimensions other than uniform dimensions 148.

For example, without limitation, one or more of number of interlocking sections 146 may be larger or smaller than each other. In each case, number of interlocking sections may be arranged such that a fluid, such as air or sealant 124, does not pass through the interface between two of number of interlocking sections 146.

As depicted, each one of number of interlocking sections 146 may move relative to each other. In other words, each one of number of interlocking sections 146 is configured to move independently of others of number of interlocking sections 146. In this manner, shaping portion 130 with number of interlocking sections 146 may be used to cover or seal fastener 116 on surface 150 of object 102 when surface 150 is uneven.

In some examples, shaping portion 130 may include liner 152. In one example, liner 152 may be part of inner surface 168 of shaping portion 130 in cavity 138. In other illustrative examples, liner 152 may be absent from shaping portion 130.

Liner 152 may be configured such that sealant 124 may not adhere to liner 152 when sealant 124 is present in shaping portion 130. Liner 152 also may engage with number of interlocking sections 146 such that sealant 124 may not pass through the interface between liner 152 and number of interlocking sections 146. In other words, liner 152 may substantially prevent sealant 124 from leaking out of shaping portion 130 during application of sealant 124. In one illustrative example, liner 152 may comprise metal, metal alloy, plastic, acrylic, polycarbonate, or other suitable type of material.

In this example, centering portion 132 may be moveably located within cavity 138 of shaping portion 130. In some examples, centering portion 132 may be located in substantially the center of shaping portion 130. In other examples, centering portion 132 may be arranged differently.

As depicted, centering portion 132 may have channel 154. Channel 154 may be configured to receive fastener 116 such that position 156 of shaping portion 130 may be desired position 158. Desired position 158 may be a desired position of shaping portion 130 about fastener 116 when fastener 116 is received in cavity 138. Centering portion 132 also may deliver sealant 124 into cavity 138 of shaping portion 130 through channel 154 to form layer of sealant 114 over fastener 116.

In the illustrative example, centering portion 132 may move between extended position 160 and retracted position 162 to position shaping portion 130 in desired position 158 about fastener 116. As an example, centering portion 132 may move along axis 164 extending centrally through fastener 116 when moving between extended position 160 and retracted position 162. Movement system 163 may move centering portion 132 along axis 164 in the illustrative example.

In some examples, movement system 163 may be operated by human operator 178. In other words, human operator 178 may move one or more of shaping portion 130, centering portion 132, and support system 134 in a desired manner.

Centering portion 132 may include interlocking base section 166. In this example, interlocking base section 166 may be arranged such that when centering portion 132 is in extended position 160, interlocking base section 166 touches fastener 116.

When centering portion 132 is in extended position 160, centering portion 132 may be substantially flush with fastener 116. In particular, interlocking base section 166 may be substantially flush with fastener 116. In this manner, centering portion 132 may center fastener 116 in cavity 138 of shaping portion 130.

Centering portion 132 may then move to retracted position 162 to deliver sealant 124 into cavity 138. When centering portion 132 is in retracted position 162, interlocking base section 166 may engage with inner surface 168 of shaping portion 130. Interlocking base section 166 of centering portion 132 may engage with inner surface 168 of shaping portion 130 to reduce the possibility of sealant 124 passing through the interface between centering portion 132 and shaping portion 130.

In some illustrative examples, centering portion 132 may begin delivering sealant 124 into cavity 138 before centering portion 132 is in retracted position 162. For example, without limitation, centering portion 132 may deliver sealant 124 into cavity 138 of shaping portion 130 when centering portion 132 is seventy-five percent retracted from extended position 160. In the illustrative example, centering portion 132 may be configured to deliver sealant 124 at any point between extended position 160 and retracted position 162, depending on the particular implementation.

In this illustrative example, support system 134 may be configured to maintain desired position 158 of shaping portion 130 as centering portion 132 moves between extended position 160 and retracted position 162. Support system 134 also may aid in insuring that shaping portion 130 is removed from fastener 116 with layer of sealant 114 in a desired manner.

For instance, support system 134 may stabilize sealant applicator 128 such that shaping portion 130 may be removed from fastener 116 with layer of sealant 114 along axis 164 of fastener 116. In this fashion, the removal of shaping portion 130 from fastener 116 with layer of sealant 114 may not alter the shape of layer of sealant 114 in an undesired manner.

As depicted, support system 134 may be physically associated with shaping portion 130 and configured to hold shaping portion 130 in desired position 158. In particular, support system 134 may hold shaping portion 130 in desired position 158 when sealant 124 flows into cavity 138 of shaping portion 130 to form layer of sealant 114 over fastener 116.

Support system 134 may take a number of different forms. For example, without limitation, support system 134 includes components selected from at least one of a vacuum sealing device, a magnet clamping system, a lock, a clip, a track, a mechanical relative position location device, a robotic arm, or other suitable types of support systems.

In this illustrative example, support system 134 may include number of support elements 170. For example, without limitation, number of support elements 170 may be one element, five elements, ten elements, or some other suitable number of elements.

Number of support elements 170 may be configured to attach sealant applicator 128 with support system 134 to surface 150 of object 102 in which fastener system 108 may be installed. For example, without limitation, number of support elements 170 may be arranged such that shaping portion 130 may not rotate about axis 164 when sealant 124 is applied to fastener 116. In the illustrative example, "attach" may mean to secure one component to another component such that the components may not move relative to each other. In other illustrative examples, however, number of support elements 170 may not attach to surface 150 of object 102.

As illustrated, number of support elements 170 may have a number of different shapes. For example, without limitation, number of support elements 170 may have a cylindrical shape, a square shape, a hexagonal shape, an octagonal shape, or some other suitable shape.

In some illustrative examples, each one of number of support elements 170 may move independently of one another. For example, without limitation, one of number of support elements 170 may attach to surface 150 of object 102 while others of number of support elements 170 may not attach to surface 150 of object 102.

In still other examples, number of support elements 170 may be a single support element and may attach to surface 150 of object 102. In this case, number of support elements 170 may be attached to, for example, without limitation, a robotic arm, a robotic device, a stationary object, or some other suitable object such that number of support elements 170 may keep shaping portion 130 in desired position 158 and substantially prevent undesired movement of shaping portion 130 and centering portion 132.

When number of support elements 170 is configured to attach to surface 150 of object 102, number of support elements 170 may include a number of attachment portions 172. Attachment portions 172 may make direct contact with surface 150 of object 102. Attachment portions 172 may take a number of different forms. For example, without limitation, attachment portions 172 may be selected from one of suction cups, magnets, clips, ties, adhesive, or other suitable types of attachment devices.

In some examples, number of support elements 170 may extend, retract, or extend and retract in the same manner as centering portion 132. In this case, movement system 163 may extend and retract number of support elements 170.

In this illustrative example, housing 136 may house some or all of shaping portion 130, centering portion 132, and support system 134. Additionally, housing 136 may include sealant source 174.

In one example, sealant source 174 may include sealant cartridge 176. Sealant cartridge 176 may be configured to hold sealant 124 and deliver sealant 124 into channel 154 of centering portion 132 after centering portion 132 may be moved to retracted position 162. Sealant cartridge 176 in housing 136 may be configured to be removable such that a new sealant cartridge may be put in its place. In this manner, different types of sealant 124 may be used interchangeably with sealant applicator 128.

In another illustrative example, sealant source 174 may have a hose or tube to a source of sealant 124. In this instance, components for sealant source 174 may be located within housing 136 or may be located in some other location external to housing 136, or both. In still other examples, sealant applicator 128 may include both sealant cartridge 176 and an additional sealant source external to housing 136.

In these depicted examples, sealant applicator 128 may be configured to be operated by human operator 178, robotic operator 180, or some other type of operator, depending on the particular implementation. For example, without limitation, human operator 178 may be able to align sealant applicator 128 over fastener 116 such that shaping portion 130 may receive fastener 116. In this case, centering portion 132 may move to extended position 160 to make sure shaping portion 130 is in desired position 158 over fastener 116. Human operator 178 may then cause sealant 124 to flow from sealant cartridge 176 manually. In other illustrative examples, once human operator 178 may align sealant applicator 128 over fastener 116, centering portion 132 may move automatically and sealant 124 may be delivered over fastener 116 without additional work from human operator 178.

In one illustrative example, sealant applicator 128 may be operated by robotic operator 180. For example, without limitation, sealant applicator 128 may take the form of end effector device 182 configured for use with robotic operator 180. Robotic operator 180 may take the form of, for example, without limitation, a robotic arm.

With the use of sealant applicator 128, layer of sealant 114 may be applied with desired thickness 142. Desired thickness 142 may stay substantially the same during all phases of application and removal of sealant applicator 128. In this manner, sealant applicator 128 may provide efficient and cost effective application of sealant 124.

Additionally, because layer of sealant 114 may be applied with desired thickness 142, fewer of number of fasteners 110 in fastener system 108 may need rework. For instance, sealant applicator 128 may increase the likelihood that layer of sealant 114 meets manufacturing standards and requirements. As a result, the manufacturing of object 102 with fastener system 108 may take less time and be more cost-effective than some currently used systems.

The illustration of manufacturing environment 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Although the illustrative examples are described with respect to an aircraft, an illustrative embodiment may be applied to other types of platforms. The platform may be, for example, without limitation, a mobile platform, a stationary platform, a land-based structure, an aquatic-based structure, and a space-based structure. More specifically, the platform, may be a surface ship, a tank, a personnel carrier, a train, a spacecraft, a space station, a satellite, a submarine, an automobile, a power plant, a bridge, a dam, a house, a manufacturing facility, a building, and other suitable platforms.

The illustrations of shaping portion 130, centering portion 132, and support system 134 in FIG. 1 are not meant to imply physical or architectural limitations to the manner in which an illustrative embodiment may be implemented. Other components in addition to or in place of the ones illustrated may be used. Some components may be optional.

Figure 2:
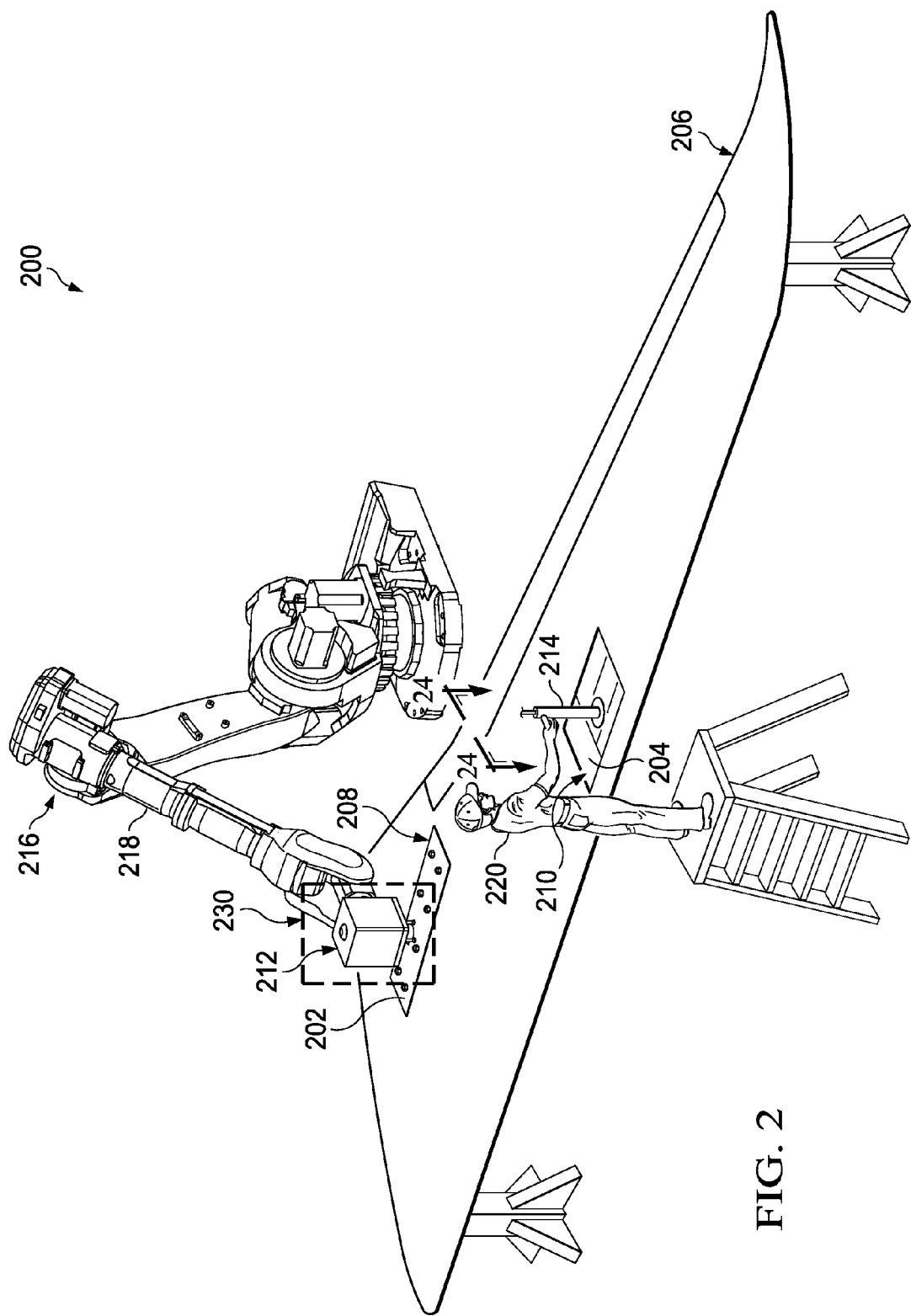
FIG. 2 is an illustration of a manufacturing environment in accordance with an illustrative embodiment.

Turning next to FIG. 2, an illustration of a manufacturing environment is depicted in accordance with an illustrative embodiment. Manufacturing environment 200 may be an example of one implementation for manufacturing environment 100 shown in block form in FIG. 1.

As illustrated, manufacturing environment 200 may include stringer 202 and stringer 204, which may be examples of implementations for object 102 in FIG. 1. Stringer 202 and stringer 204 may be associated with wing 206 in the illustrative example. Stringer 202 may include number of fasteners 208, while stringer 204 may include number of fasteners 210. Number of fasteners 208 and number of fasteners 210 may be examples of implementations for number of fasteners 110 in FIG. 1.

As depicted, sealant applicator 212 and sealant applicator 214 may be used to cover and seal number of fasteners 208 and number of fasteners 210, respectively. Sealant applicator 212 and sealant applicator 214 may be examples of implementations for sealant applicator 128 in FIG. 1.

In this illustrative example, robotic device 216 may be part of sealant applicator 212 and may be configured to operate at least one of shaping portion 130, centering portion 132, or other components within support system 134 from FIG. 1. In this instance, robotic device 216 may comprise arm 218 and components in sealant applicator 212 may be an end effector of arm 218. Robotic device 216 with arm 218 may be one example of an implementation for robotic operator 180 with end effector device 182 in FIG. 1.

In this illustration, robotic device 216 may move arm 218 over each of number of fasteners 208 to cover and seal number of fasteners 208. In particular, robotic device 216 may apply layer of sealant 114 in FIG. 1 to each of number of fasteners 208 by moving along stringer 202. Robotic device 216 may align shaping portion 130 and centering portion 132 about each of number of fasteners 208 to apply layer of sealant 114 in a desired manner.

Human operator 220 may operate sealant applicator 214. Human operator 220 may be an example of one implementation for human operator 178 in FIG. 1. In some cases, human operator 220 may align sealant applicator 214 over each of number of fasteners 210 to cover and seal number of fasteners 210 with layer of sealant 114 in a desired manner. For example, without limitation, human operator 220 may hold sealant applicator 214 and guide sealant applicator 214 over each of number of fasteners 210 to apply layer of sealant 114.

In the illustrative example, sealant applicator 212 may be operated manually using robotic device 216 or human operator 220. In other words, in some examples, robotic device 216 may move centering portion 132 between extended position 160 and retracted position 162. In other examples, human operator 220 may move centering portion 132 between extended position 160 and retracted position 162, and manually attach support system 134 to stringer 204.

In other examples, centering portion 132 and support system 134 may move automatically using, for example, without limitation, an actuator. A more-detailed illustration of a portion of sealant applicator 212 in section 230 is shown in more detail in FIG. 3.

Figure 3:
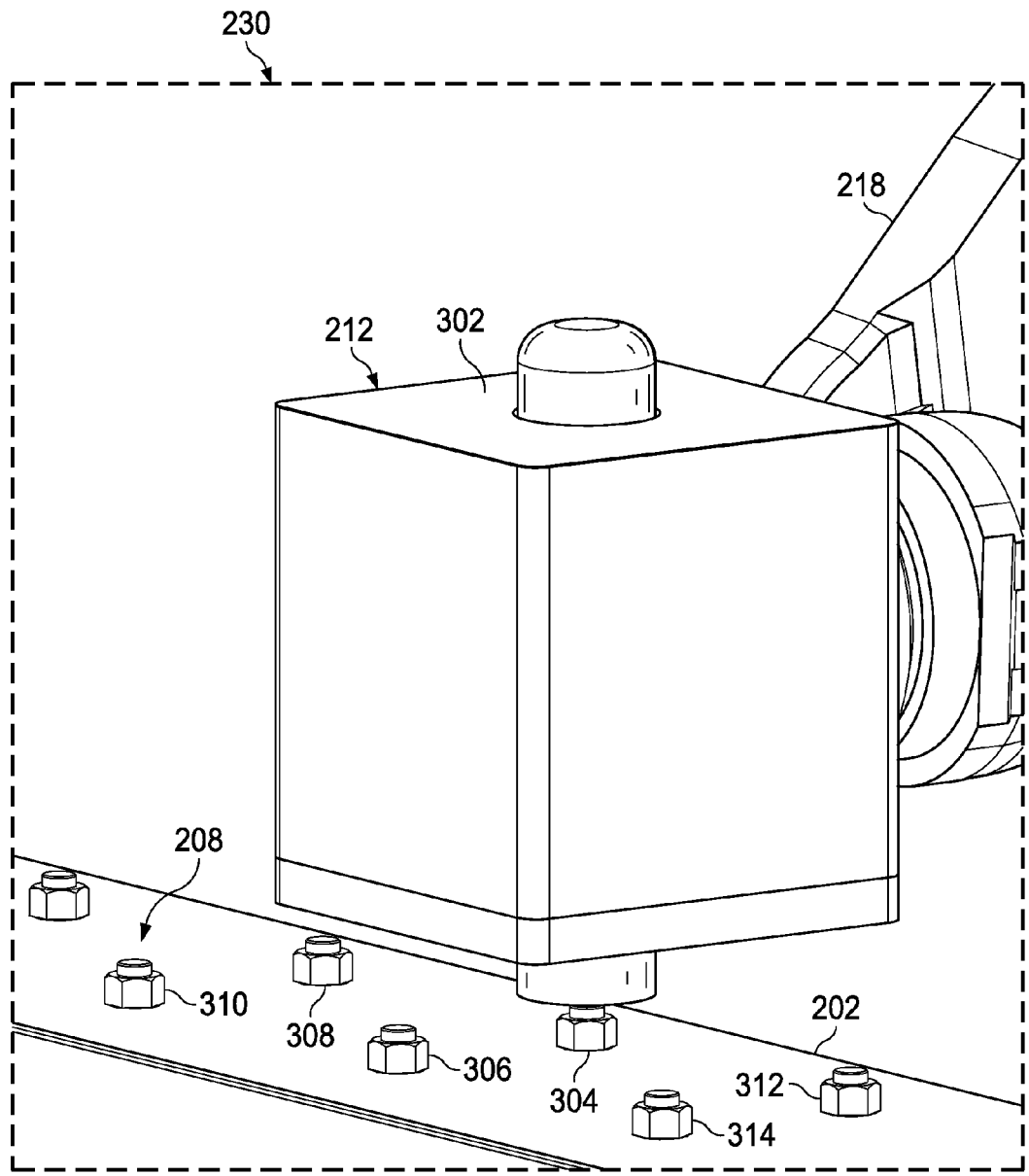
FIG. 3 is an illustration of an isometric side view of a sealant applicator in accordance with an illustrative embodiment.

With reference now to FIG. 3, an illustration of an isometric side view of sealant applicator 212 from FIG. 2 is depicted in accordance with an illustrative embodiment. In this view, sealant applicator 212 is shown in greater detail within section 230 in FIG. 2.

As depicted, sealant applicator 212 includes housing 302, which may be an example of one implementation for housing 136 in FIG. 1. In this example, number of fasteners 208 may include fastener 304, fastener 306, fastener 308, fastener 310, fastener 312, and fastener 314. Sealant applicator 212 may be positioned over fastener 304 to cover and seal fastener 304 in the illustrative example.

Figure 4:
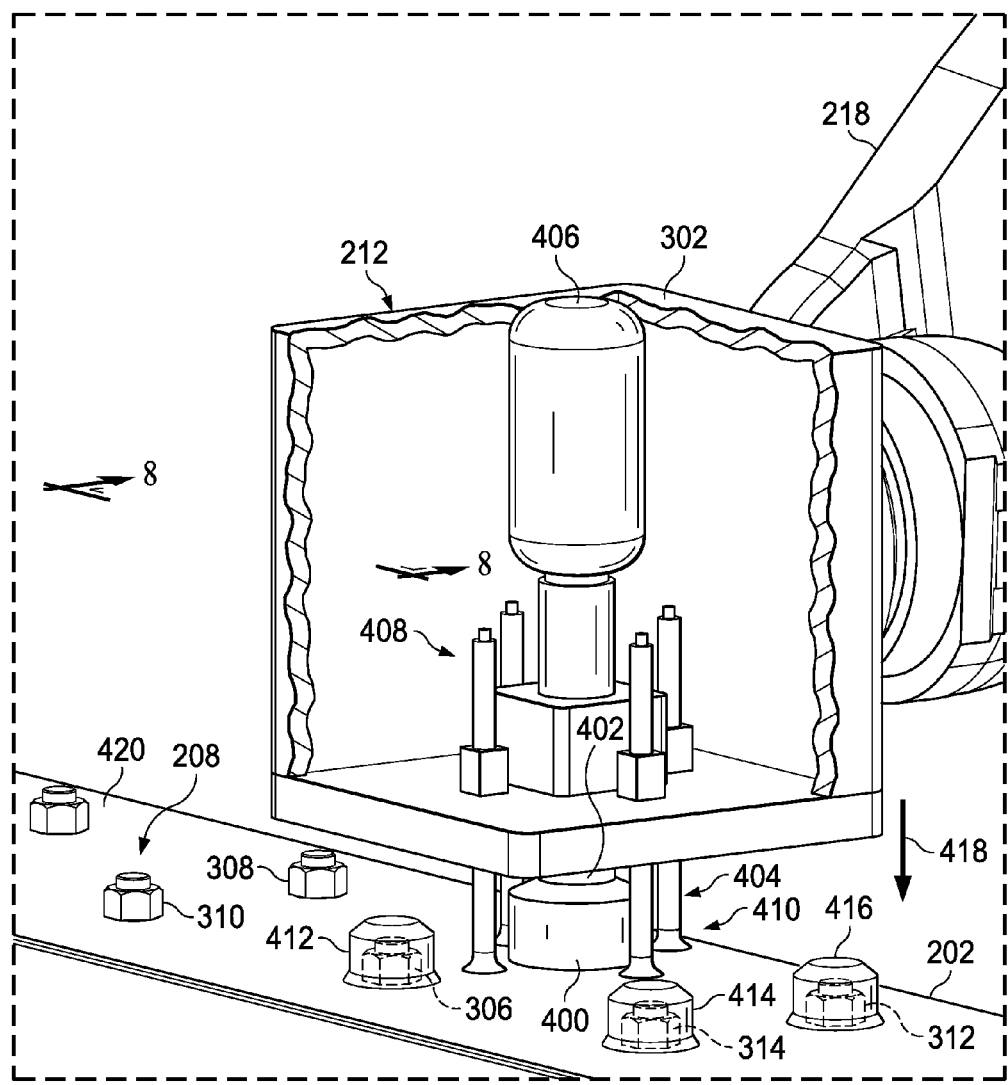
FIG. 4 is an illustration of an isometric side view of a sealant applicator in accordance with an illustrative embodiment.

In FIG. 4, an illustration of an isometric side view of sealant applicator 212 from FIG. 3 is depicted in accordance with an illustrative embodiment. As illustrated, housing 302 is shown such that other components in sealant applicator 212 may be seen.

Sealant applicator 212 may comprise shaping portion 400, centering portion 402, support system 404, and sealant cartridge 406. Shaping portion 400, centering portion 402, support system 404, and sealant cartridge 406 may be examples of implementations for shaping portion 130, centering portion 132, support system 134, and sealant cartridge 176 shown in block form in FIG. 1, respectively.

As depicted, sealant applicator 212 also may include movement system 408, which may be one example of an implementation for movement system 163 in FIG. 1. In some examples, movement system 408 may include actuators to move at least one of centering portion 402 or support system 404 into place about fastener 304 (covered in this view). In other examples, centering portion 402 and support system 404 may be moved manually or in some other suitable manner, depending on the particular implementation.

In this example, shaping portion 400 and centering portion 402 may receive fastener 304. Shaping portion 400 and centering portion 402 may receive fastener 304 and may move toward fastener 304 in the direction of arrow 418.

Number of support elements 410 in support system 404 may then be positioned on surface 420 of stringer 202. Number of support elements 410 may be one example of an implementation for number of support elements 170 shown in block form in FIG. 1. Number of support elements 410 also may move in the direction of arrow 418 toward surface 420 of stringer 202.

As shown in this illustration, fastener 306, fastener 312, and fastener 314 may have seal cap 412, seal cap 414, and seal cap 416, respectively. Seal cap 412, seal cap 414, and seal cap 416 may have been formed using sealant applicator 212 in accordance with an illustrative embodiment. For example, without limitation, sealant applicator 212 may have previously applied layer of sealant 114 to fastener 306, fastener 312, and fastener 314 to form seal cap 412, seal cap 414, and seal cap 416, respectively.

Figure 5:
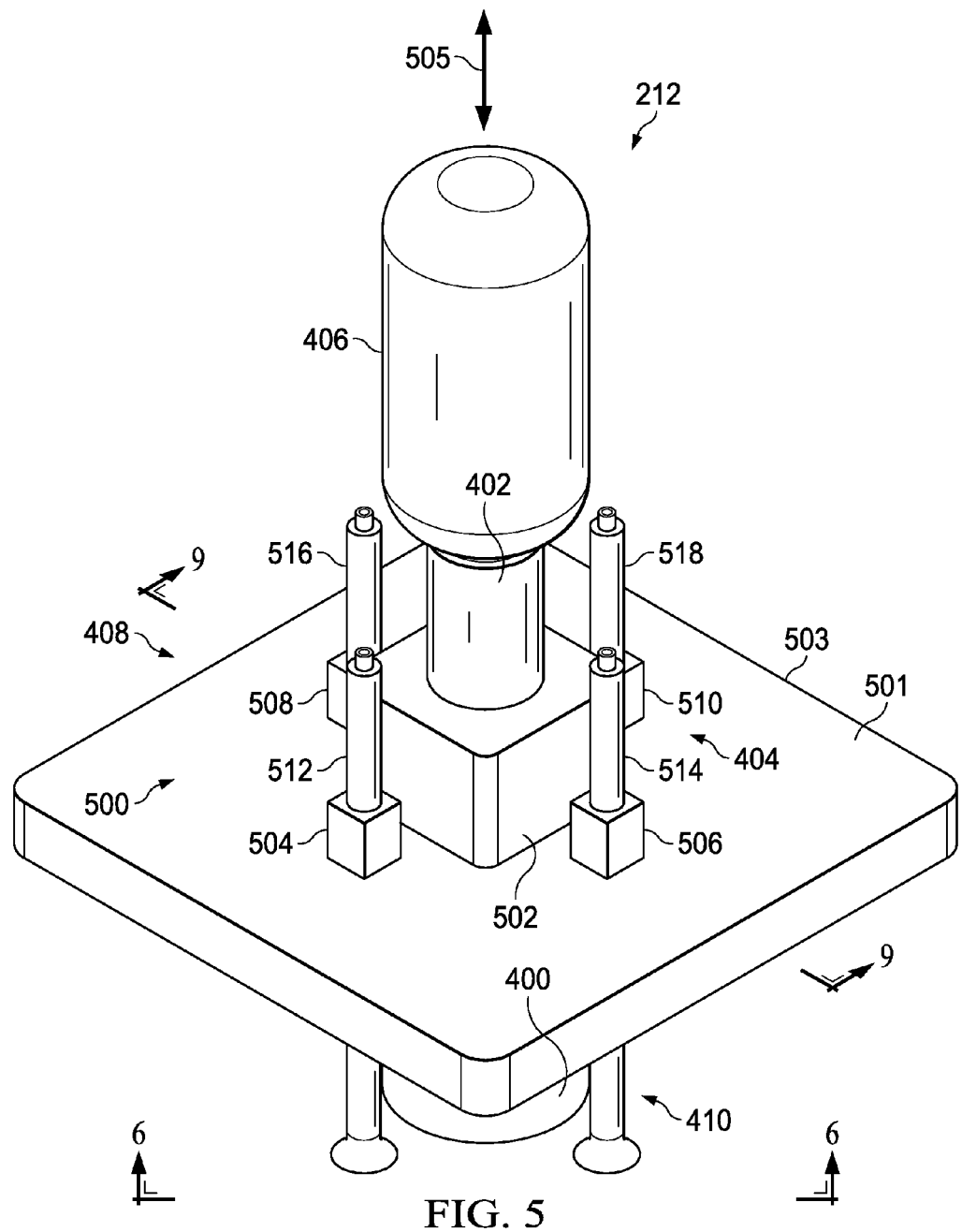
FIG. 5 is an illustration of a top isometric view of a sealant applicator in accordance with an illustrative embodiment.

With reference now to FIG. 5, an illustration of a top isometric view of sealant applicator 212 shown in FIG. 4 is depicted in accordance with an illustrative embodiment. In this example, housing 302 has been removed to show the components of sealant applicator 212 in more detail.

As depicted, movement system 408 may include number of actuators 500. Number of actuators 500 may be arranged on upper surface 501 of base portion 503 of housing 302. In this example, number of actuators 500 may be configured to move centering portion 402 and support system 404 along axis 505. In other words, number of actuators 500 may extend and retract centering portion 402 and support system 404. Axis 505 may be one example of an implementation for axis 164 in FIG. 1.

In one example, number of actuators 500 include actuator 502, actuator 504, actuator 506, actuator 508, and actuator 510 (not shown). In other examples, more than five actuators may be present in sealant applicator 212. For example, without limitation, one actuator, seven actuators, ten actuators, or some other number of actuators may be present in number of actuators 500 in sealant applicator 212.

As depicted, number of support elements 410 in support system 404 may comprise support element 512, support element 514, support element 516, and support element 518. Support element 512, support element 514, support element 516, and support element 518 may extend and retract using number of actuators 500. In one example, actuator 504, actuator 506, actuator 508, and actuator 510 may extend and retract support element 512, support element 514, support element 516, and support element 518, respectively.

Although support system 404 is shown with four support elements, support system 404 may comprise more or fewer support elements, depending on the particular implementation. For example, without limitation, support system 404 may comprise one support element, three support elements, five support elements, or some other number of support elements 410 arranged about shaping portion 400. In these examples, number of support elements 410 may be arranged such that shaping portion 400 and centering portion 402 may not rotate about axis 505 when receiving fastener 304, applying layer of sealant 114 to fastener 304, and retracting from fastener 304.

Figure 6:
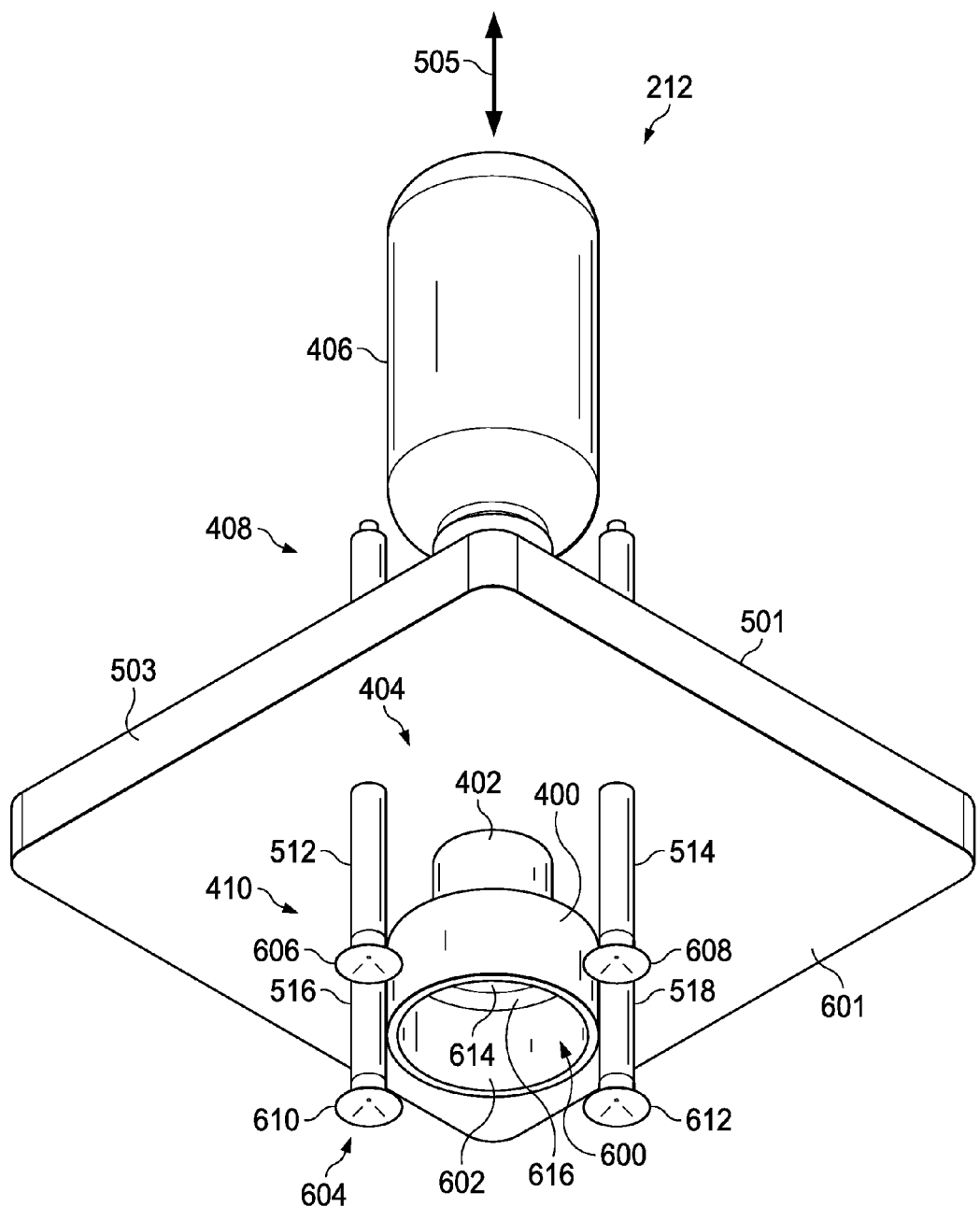
FIG. 6 is an illustration of a bottom isometric view of a sealant applicator in accordance with an illustrative embodiment.

Turning next to FIG. 6, an illustration of a bottom isometric view of sealant applicator 212 seen in the direction of lines 6-6 in FIG. 5 is depicted in accordance with an illustrative embodiment. In this view, shaping portion 400, centering portion 402, and number of support elements 410 are shown extending from lower surface 601 of base portion 503.

In this illustrative example, shaping portion 400 may include cavity 600. Cavity 600 may be one example of an implementation for cavity 138 in FIG. 1. Cavity 600 may be configured to receive fastener 304.

As depicted, shaping portion 400 may have inner surface 602. Inner surface 602 may be configured such that sealant 124 may not adhere to inner surface 602. For example, without limitation, inner surface 602 may include a coating such as liner 152 in FIG. 1.

In this view, number of support elements 410 may comprise a number of attachment portions 604. Attachment portions 604 may be examples of implementations for attachment portions 172 in FIG. 1.

Attachment portions 604 may include attachment portion 606, attachment portion 608, attachment portion 610, and attachment portion 612. Attachment portion 606, attachment portion 608, attachment portion 610, and attachment portion 612 may correspond to support element 512, support element 514, support element 516, and support element 518, respectively.

In this illustrative example, attachment portions 604 may be suction cups configured to attach to surface 420 of stringer 202. In other illustrative examples, attachment portions 604 may attach to surface 420 of stringer 202 in some other manner, depending on the type of surface 420 of stringer 202.

For example, without limitation, in other illustrative examples, attachment portions 604 may be magnets. In this case, a counter magnet external to surface 420 of stringer 202 may be used. When stringer 202 is a composite structure, attachment portions 604 may be configured to attach to stringer 202 in some other manner.

As illustrated, centering portion 402 may comprise channel 614 and interlocking base section 616. Channel 614 and interlocking base section 616 may be examples of implementations for channel 154 and interlocking base section 166 shown in block form in FIG. 1. Channel 614 may be configured to deliver sealant 124 to cavity 600 when shaping portion 400 may be arranged over fastener 304. In some examples, channel 614 may also have a coating (not shown) such that sealant 124 may not adhere to channel 614. When the coating is present, the coating may be an example of liner 152 in FIG. 1. In other illustrative examples, when centering portion 402 may be comprised of plastic, the material properties of plastic may not allow sealant 124 to adhere to channel 614.

Interlocking base section 616 of centering portion 402 may be configured to engage inner surface 602 of shaping portion 400 such that fluid 122 in FIG. 1 may not pass through the interface of centering portion 402 and shaping portion 400. For example, without limitation, interlocking base section 616 may substantially prevent sealant 124 in cavity 600 from leaking out of shaping portion 400, centering portion 402, or both.

Figure 7:
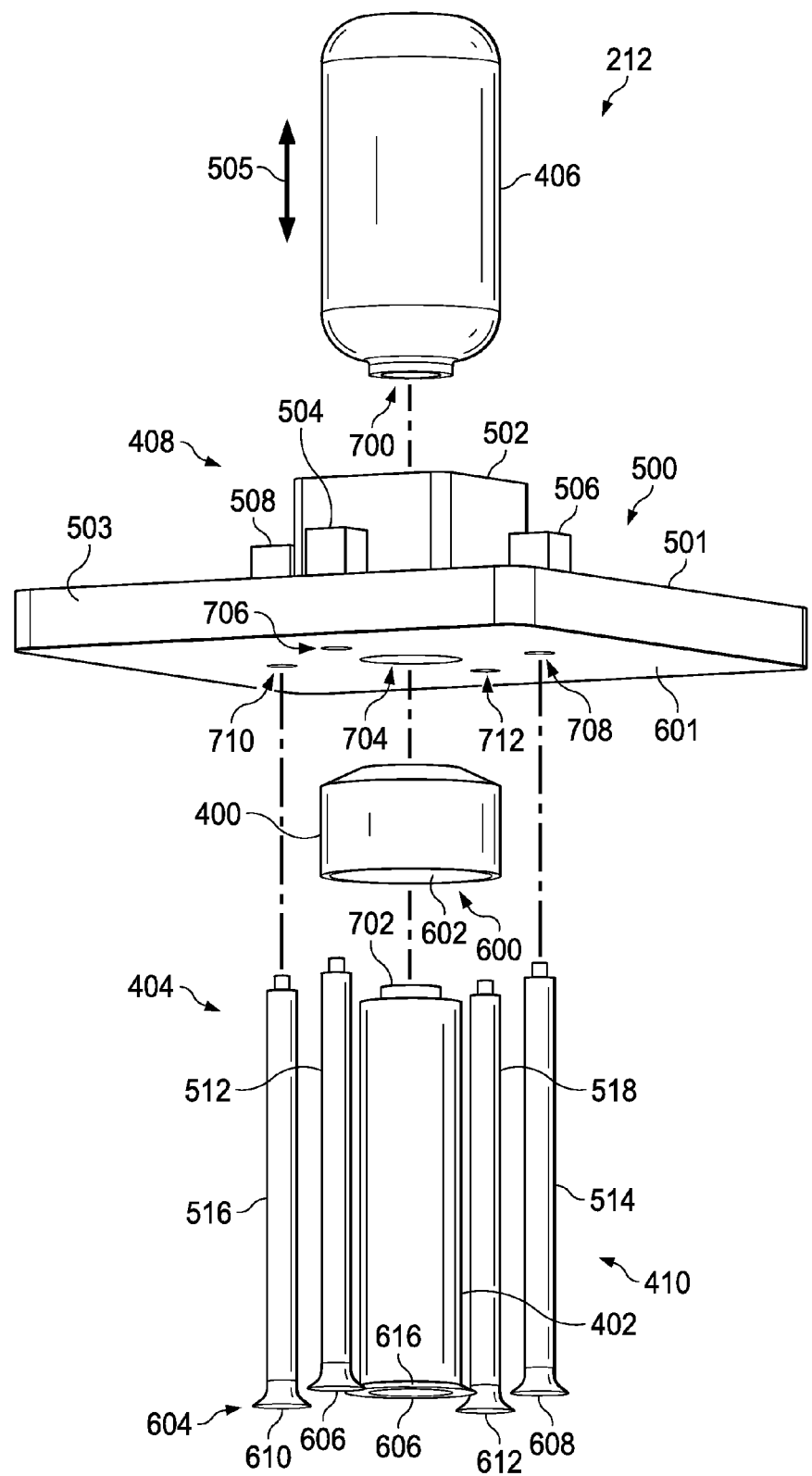
FIG. 7 is an illustration of an exploded view of a sealant applicator in accordance with an illustrative embodiment.

In FIG. 7, an illustration of an exploded view of sealant applicator 212 in FIG. 6 is depicted in accordance with an illustrative embodiment. In this depicted example, an exploded view of sealant applicator 212 is shown.

As illustrated, sealant cartridge 406 may include cavity 700. In one example, cavity 700 may hold sealant 124 in sealant cartridge 406. As can be seen, sealant cartridge 406 may be configured to be removable such that other types of cartridges or attachments may be used in sealant applicator 212. For example, without limitation, sealant cartridge 406 may be removed and replaced by a cartridge that may hold a different type of fluid, depending on the particular implementation.

In the illustrative example, top portion 702 of centering portion 402 may engage with cavity 700 of sealant cartridge 406. Centering portion 402 may be configured to fit through opening 704 in base portion 503 of sealant applicator 212 such that centering portion 402 may move along axis 505.

Shaping portion 400 may be sleeved around centering portion 402 in the illustrative example.

In this illustrative example, shaping portion 400 may be configured such that shaping portion 400 may not pass through opening 704 in base portion 503. In other illustrative examples, shaping portion 400 may pass through opening 704 as centering portion 402 extends and retracts along axis 505.

Support element 512, support element 514, support element 516, and support element 518 may extend and retract along axis 505 through opening 706, opening 708, opening 710, and opening 712, respectively. Attachment portion 606, attachment portion 608, attachment portion 610, and attachment portion 612 may not be configured to retract through opening 706, opening 708, opening 710, and opening 712, respectively, in some examples. In other examples, attachment portion 606, attachment portion 608, attachment portion 610, and attachment portion 612 may fully retract into housing 302.

Although centering portion 402 is shown as having a cylindrical shape in the illustrative example, centering portion 402 may have a number of different shapes in other illustrative examples. For example, without limitation, centering portion 402 may have a rectangular shape, a triangular shape, a hexagonal shape, an octagonal shape, or some other suitable shape that may fit through opening 704 and engage with cavity 700 of sealant cartridge 406.

Figure 8:
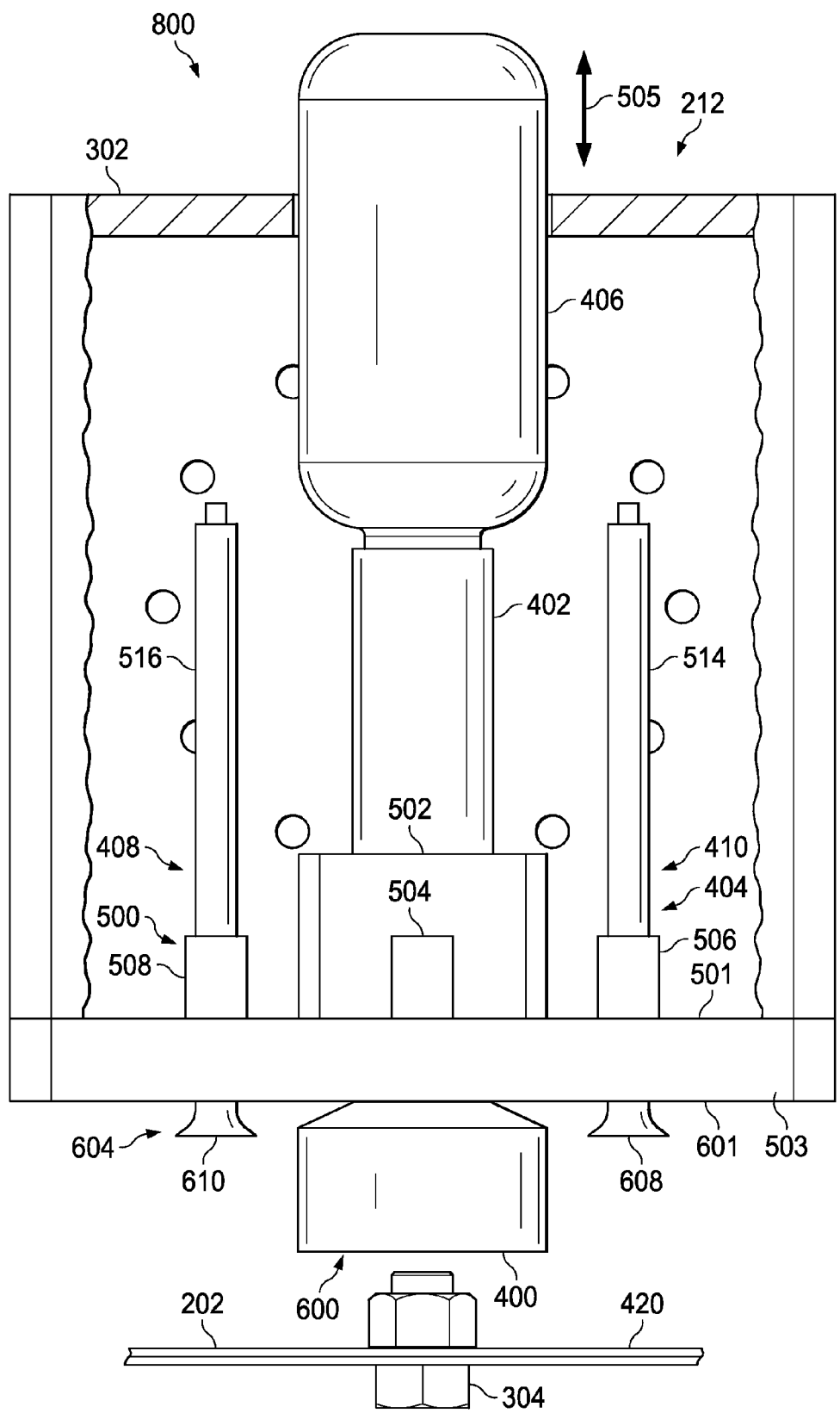
FIG. 8 is an illustration of a front view of a sealant applicator arranged over a fastener in accordance with an illustrative embodiment.

With reference next to FIG. 8, an illustration of a front view of sealant applicator 212 arranged over fastener 304 seen along lines 8-8 in FIG. 4 is depicted in accordance with an illustrative embodiment. In this illustrative example, sealant applicator 212 is shown in retracted position 800. In particular, centering portion 402 and number of support elements 410 may be seen retracted into housing 302.

FIGS. 9-14 are illustrations of cross-sectional views of sealant applicator 212 taken along lines 9-9 in FIG. 5. FIGS. 9-14 may describe one method for applying layer of sealant 114 over fastener 304. In these examples, centering portion 402 and shaping portion 400 in sealant applicator 212 may be aligned over fastener 304 by robotic device 216 or human operator 220, as described above.

Figure 9:
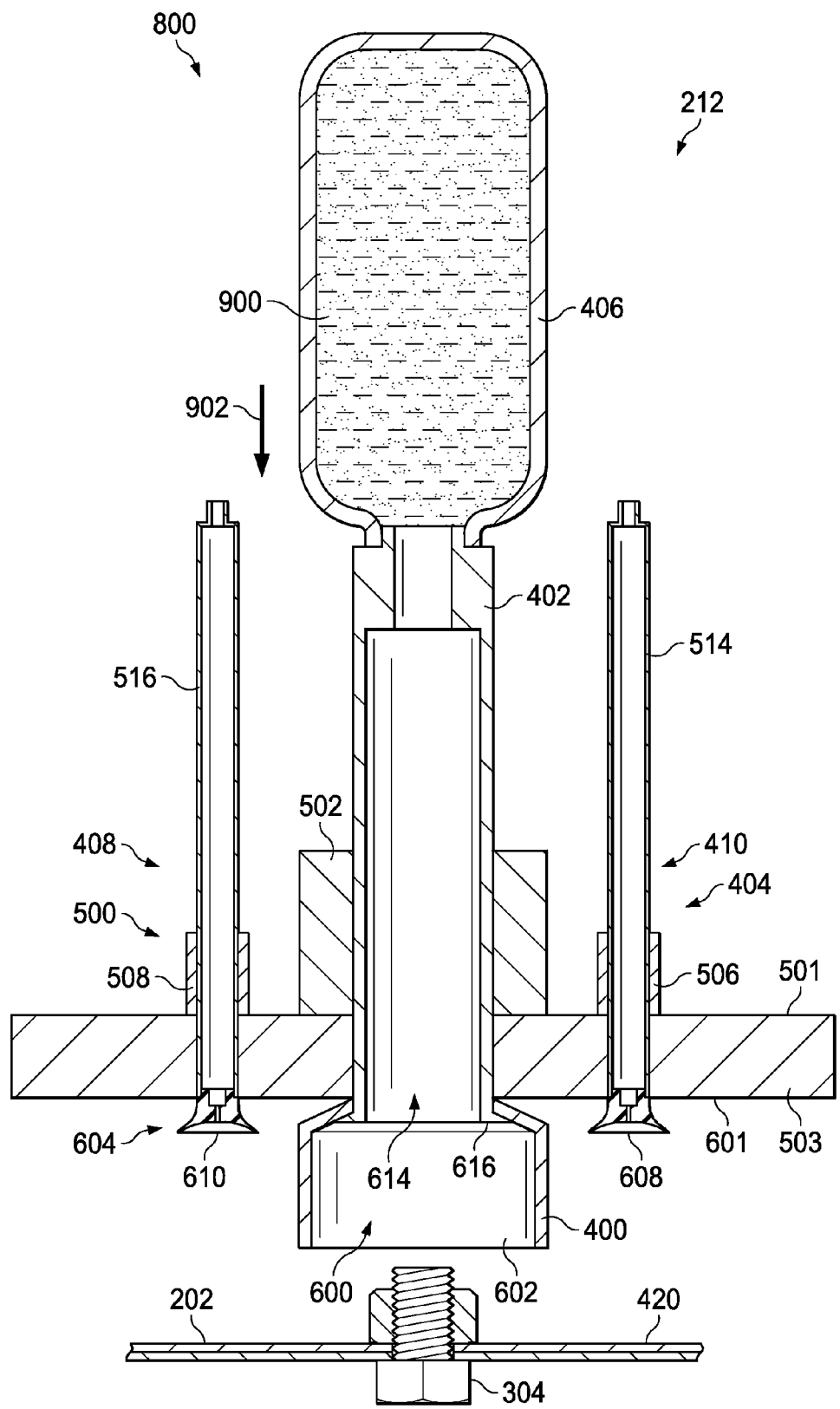
FIG. 9 is an illustration of a sealant applicator in accordance with an illustrative embodiment.

With reference to FIG. 9, an illustration of sealant applicator 212 seen along lines 9-9 in FIG. 5 is depicted in accordance with an illustrative embodiment. In this example, sealant applicator 212 may begin in retracted position 800. In this view, sealant cartridge 406 may include sealant 900 and hold sealant 900 until sealant applicator 212 delivers sealant 900 to cavity 600 to cover and seal fastener 304. Centering portion 402 and shaping portion 400 may be configured to move in the direction of arrow 902.

Figure 10:
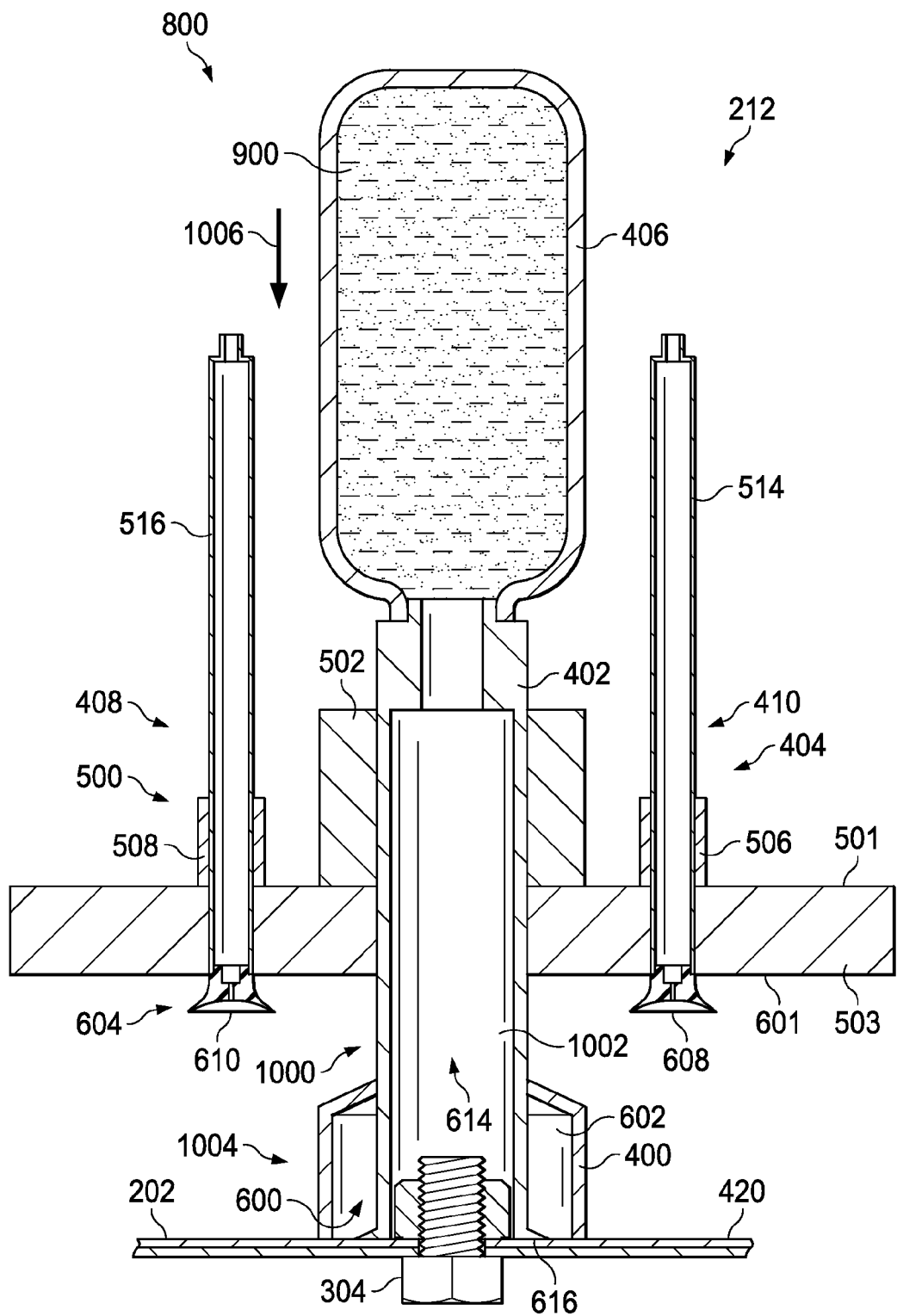
FIG. 10 is an illustration of a sealant applicator in an extended position in accordance with an illustrative embodiment.

In FIG. 10, an illustration of sealant applicator 212 in an extended position is depicted in accordance with an illustrative embodiment. Centering portion 402 may have been moved in the direction of arrow 902 in FIG. 9 to extended position 1000. In extended position 1000, interlocking base section 616 of centering portion 402 may be substantially flush with surface 420 of stringer 202. As centering portion 402 may be moved to extended position 1000, shaping portion 400, which may be moveably connected to centering portion 402, may move as well. In this instance, gravity may cause shaping portion 400 to slide downward toward surface 420 of stringer 202. In other illustrative examples, an additional movement system may be present to move shaping portion 400.

In this illustrative example, centering portion 402 may be configured for a specific type or size of fastener. For example, without limitation, centering portion 402 may be configured to receive a particular size of fastener 304. In some examples, centering portion 402 may be resized to fit multiple sizes of fastener 304. In other illustrative examples, centering portion 402 may be detached from sealant applicator 212 and changed with another centering portion having a different size.

As depicted, centering portion 402 may be configured to center fastener 304 in cavity 600 of shaping portion 400. Inner surface 1002 of channel 614 of centering portion 402 may be substantially flush with fastener 304. At this point in the process, none of sealant 900 may flow through channel 614.

In these depicted examples, centering portion 402 may be configured to place shaping portion 400 in desired position 1004 about fastener 304. Desired position 1004 may be an example of one implementation for desired position 158 in FIG. 1. In particular, desired position 1004 may be selected such that sealant 900 may be applied to fastener 304 in a desired manner.

In this example, support system 404 with number of support elements 410 may not move as centering portion 402 moves. Support system 404 may be configured to move in the direction of arrow 1006, as shown in FIG. 11.

Figure 11:
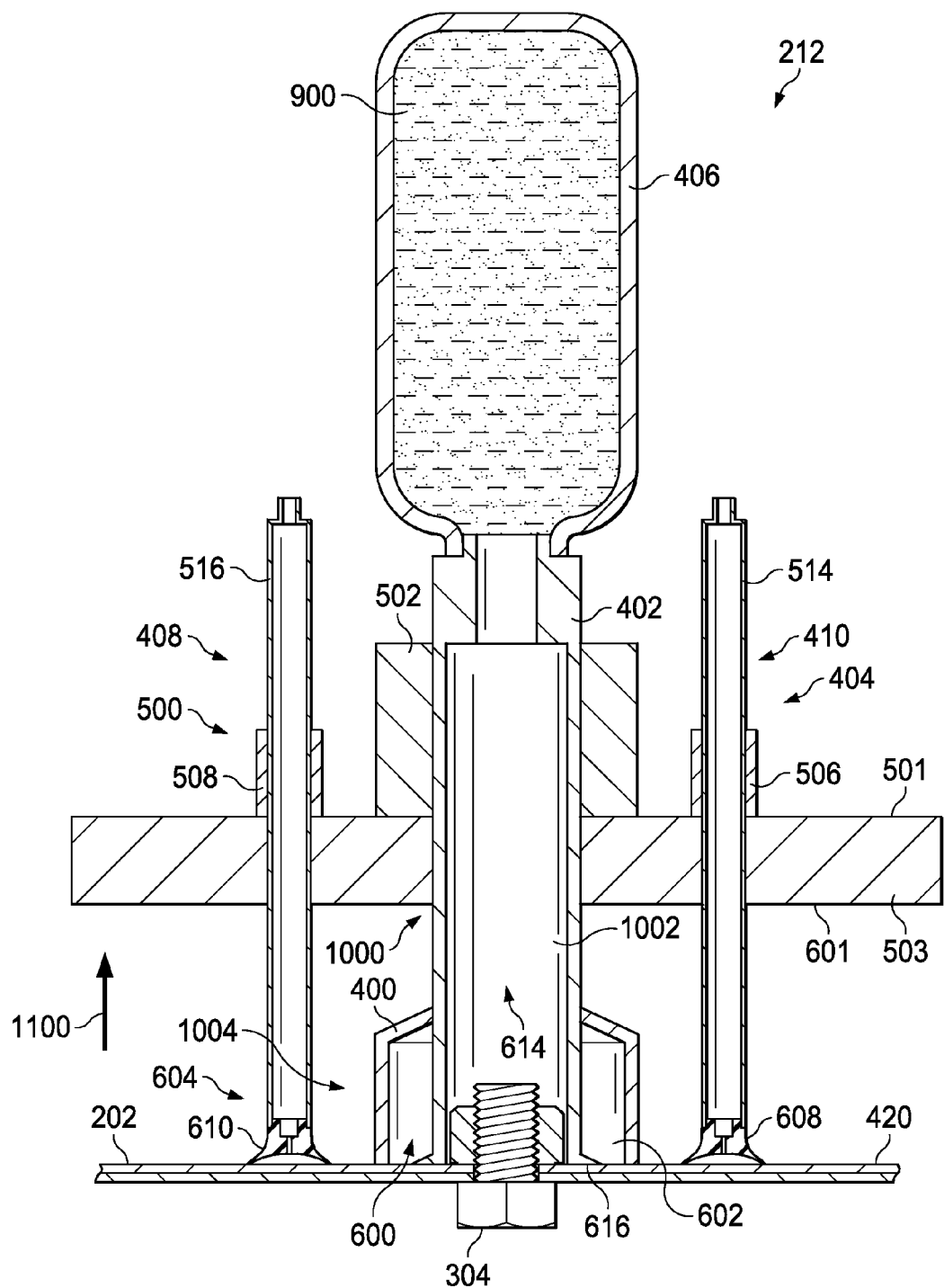
FIG. 11 is an illustration of a support system of a sealant applicator in an extended position in accordance with an illustrative embodiment.

Referring next to FIG. 11, an illustration of support system 404 of sealant applicator 212 in an extended position is depicted in accordance with an illustrative embodiment. Number of actuators 500 may have moved support system 404 toward surface 420 of stringer 202 in the direction of arrow 1006 in FIG. 10. Attachment portions 604 may then attach to surface 420 of stringer 202 such that sealant applicator 212 may not move in an undesired manner during application of sealant 900 to fastener 304. In some examples, centering portion 402 may then be configured to move upward, in the direction of arrow 1100, as shown in FIG. 12.

Figure 12:
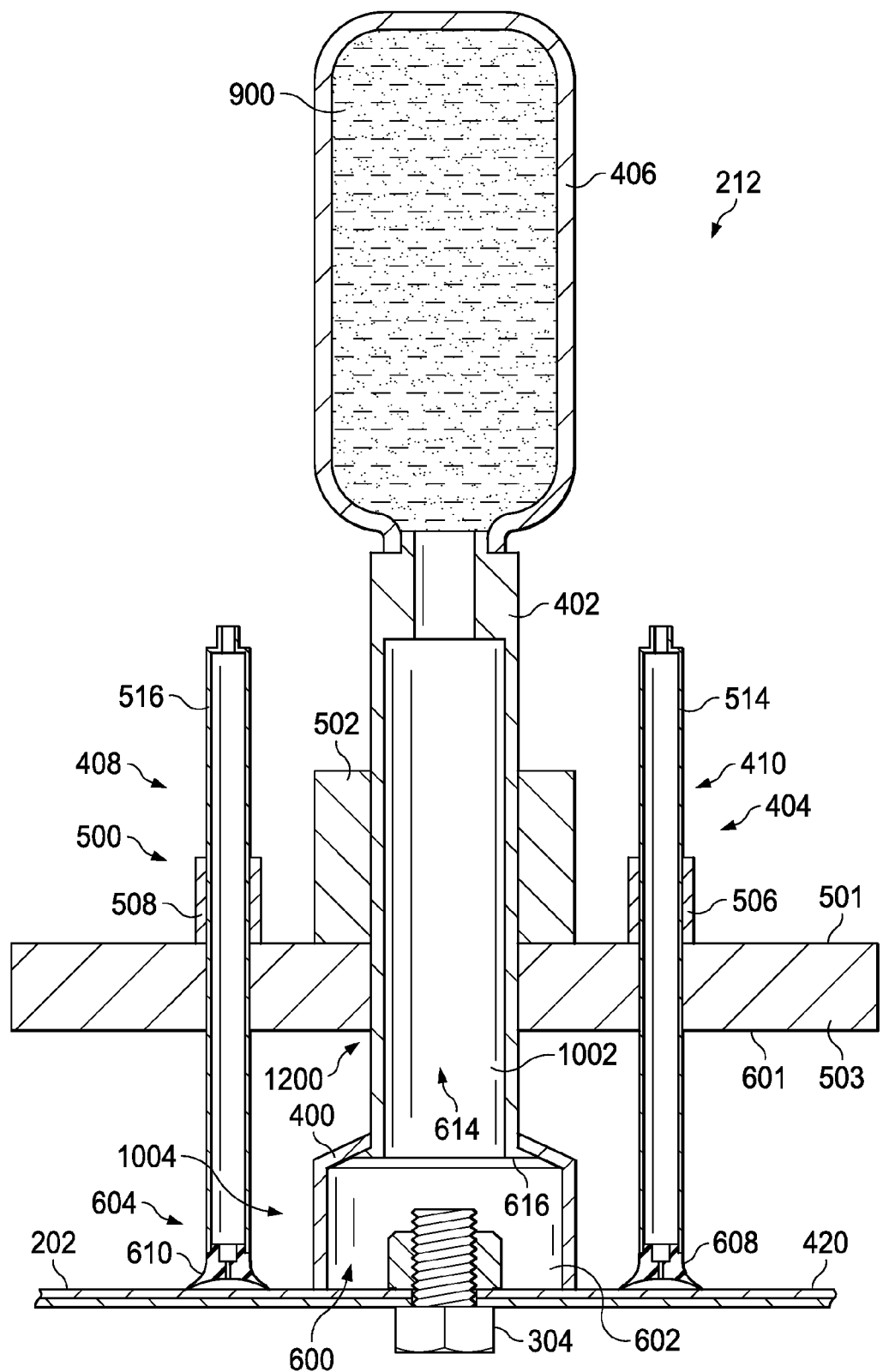
FIG. 12 is an illustration of a centering portion of a sealant applicator in a partially retracted position in accordance with an illustrative embodiment.

In FIG. 12, an illustration of centering portion 402 of sealant applicator 212 in a partially retracted position is depicted in accordance with an illustrative embodiment. Centering portion 402 may have been moved by actuator 502 in the direction of arrow 1100 in FIG. 11 to partially retracted position 1200. In the illustrative example, partially retracted position 1200 may be a position where interlocking base section 616 of centering portion 402 may engage with inner surface 602 of shaping portion 400, as described above.

Partially retracted position 1200 also may be a position where interlocking base section 616 of centering portion 402 may engage with inner surface 602 of shaping portion 400 without moving shaping portion 400 away from surface 420 of stringer 202. In other words, shaping portion 400 may remain substantially flush with surface 420 when centering portion 402 is in partially retracted position 1200 such that sealant 900 may not flow out of cavity 600 in shaping portion 400.

Sealant 900 may be dispensed over fastener 304 at a desired time. For example, human operator 178 in FIG. 1 may determine when sealant 900 may be dispensed and use handheld device 139 to allow sealant 900 to flow into centering portion 402. In this example, the fluid dynamics of sealant 900 may allow desired flow of sealant 900 when centering portion 402 is in partially retracted position 1200.

In other examples, when robotic operator 180 in FIG. 1 is used, a feedback system may be employed. This feedback system may be implemented as, for example, without limitation, controller 137, which would then allow a valve or some other dispensing tool to dispense sealant 900.

Figure 13:
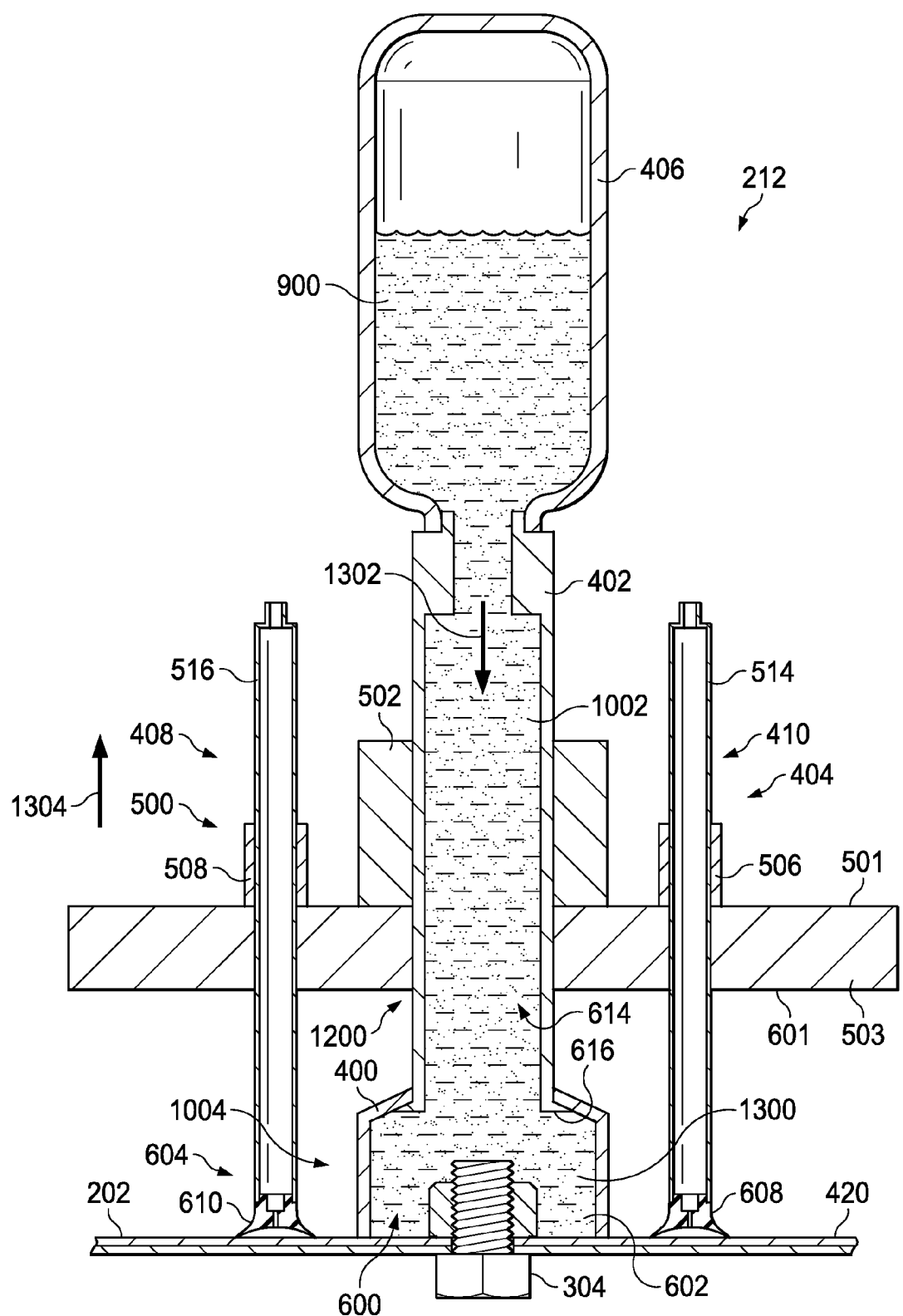
FIG. 13 is an illustration of a sealant applicator applying a sealant to a fastener in accordance with an illustrative embodiment.

Turning now to FIG. 13, an illustration of sealant applicator 212 applying sealant 900 to fastener 304 is depicted in accordance with an illustrative embodiment. Sealant 900 may be delivered to cavity 600 in shaping portion 400 through channel 614 in centering portion 402 to form layer of sealant 1300. In particular, sealant 900 may flow in the direction of arrow 1302 through channel 614 in centering portion 402. In these examples, layer of sealant 1300 may be one example of an implementation for layer of sealant 114 in FIG. 1.

After sealant 900 may form layer of sealant 1300, centering portion 402 and shaping portion 400 may be retracted. For instance, centering portion 402 and shaping portion 400 may move in the direction of arrow 1304.

Figure 14:
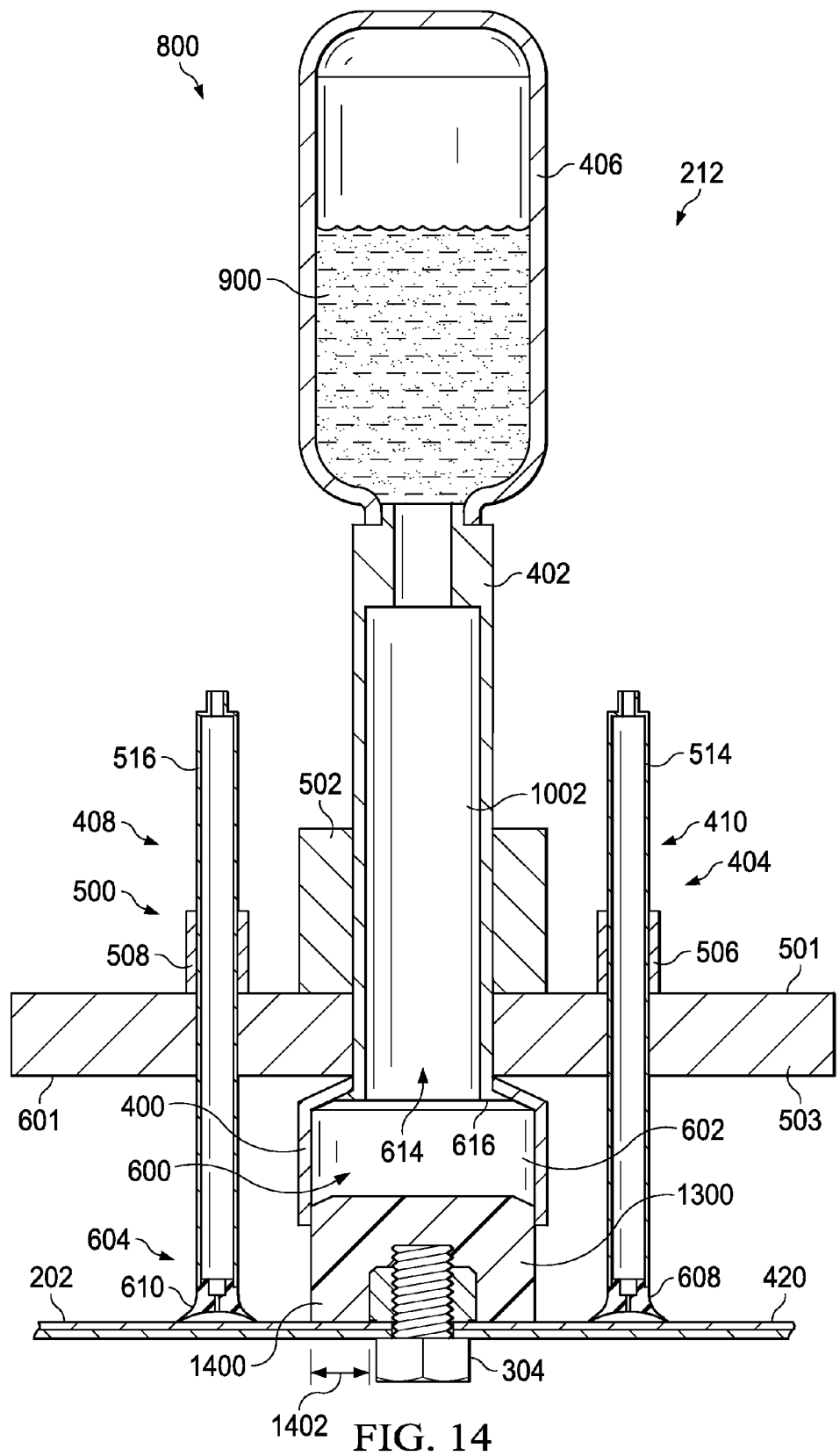
FIG. 14 is an illustration of a sealant applicator forming a layer of sealant over a fastener in accordance with an illustrative embodiment.

In FIG. 14, an illustration of sealant applicator 212 forming layer of sealant 1300 over fastener 304 is depicted in accordance with an illustrative embodiment. Centering portion 402 may have been moved in the direction of arrow 1304 in FIG. 13 back to retracted position 800. In this illustrative example, shaping portion 400 may move upward with centering portion 402 when centering portion 402 may be retracted.

As illustrated, support system 404 with number of support elements 410 may remain in extended position 1000 (as seen in FIG. 10 and FIG. 11) as centering portion 402 may be retracted. As a result, centering portion 402 and shaping portion 400 may not retract from fastener 304 with layer of sealant 1300 unevenly. Accordingly, seal cap 1400 formed with layer of sealant 1300 may have desired thickness 1402 over fastener 304. Desired thickness 1402 may be one example of an implementation for desired thickness 142 in FIG. 1. Desired thickness 1402 may be uniform thickness 144 in FIG. 1.

With the use of sealant applicator 212, layer of sealant 1300 may be applied to fastener 304 in a desired manner to have desired thickness 1402. Because support system 404 may remain in place during removal of layer of sealant 1300 and fastener 304 from cavity 600 of shaping portion 400, removal of layer of sealant 1300 and fastener 304 from cavity 600 of shaping portion 400 may occur without substantially altering the shape, thickness, or size of layer of sealant 1300. As a result, seal cap 1400 for fastener 304 may be formed more quickly and efficiently and with less rework than with some currently used sealant applicators.

Figure 15:
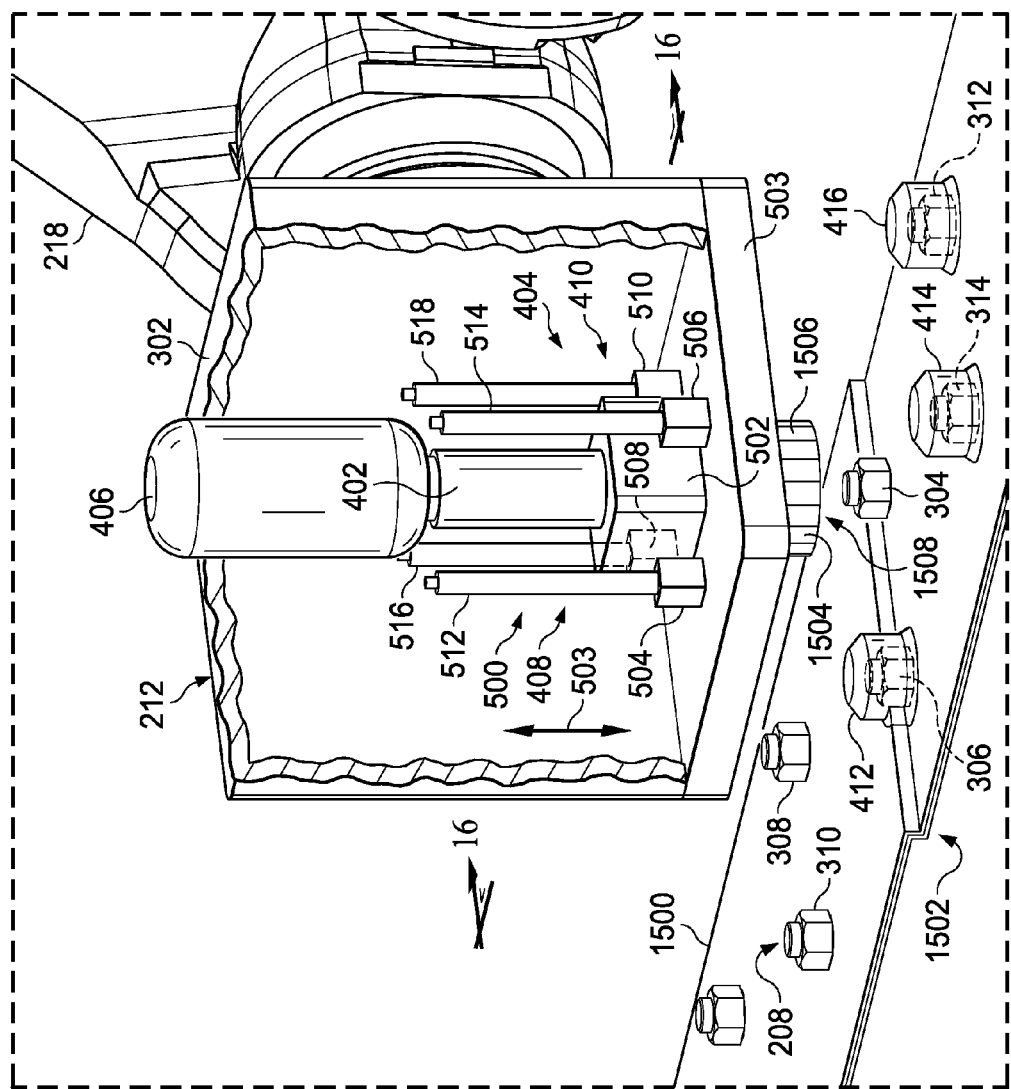
FIG. 15 is an illustration of a sealant applicator in accordance with an illustrative embodiment.

Referring now to FIG. 15, an illustration of sealant applicator 212 is depicted in accordance with an illustrative embodiment. In this example, sealant applicator 212 may be placed over object 1500. Object 1500 may have uneven surface 1502.

As depicted, shaping portion 400 of sealant applicator 212 may be replaced with shaping portion 1504. Shaping portion 1504 may have number of interlocking sections 1506. Shaping portion 1504 and number of interlocking sections 1506 may be one example of an implementation for shaping portion 130 with number of interlocking sections 146 shown in block form in FIG. 1.

In this depicted example, shaping portion 1504 with number of interlocking sections 1506 may have cavity 1508, which may be another example of an implementation for cavity 138 in FIG. 1. Number of interlocking sections 1506 may allow sealant applicator 212 to apply sealant 900 (not shown) to fastener 304 in a desired manner when fastener 304 may be located on uneven surface 1502.

FIGS. 16-21 are illustrations of cross-sectional views of sealant applicator 212 with number of interlocking sections 1506 taken along lines 16-16 in FIG. 15. FIGS. 16-21 may describe one method for applying layer of sealant 1300 over fastener 304. In these examples, centering portion 402 and shaping portion 1504 in may be aligned over fastener 304 by robotic device 216 or human operator 220, as described above.

Figure 16:
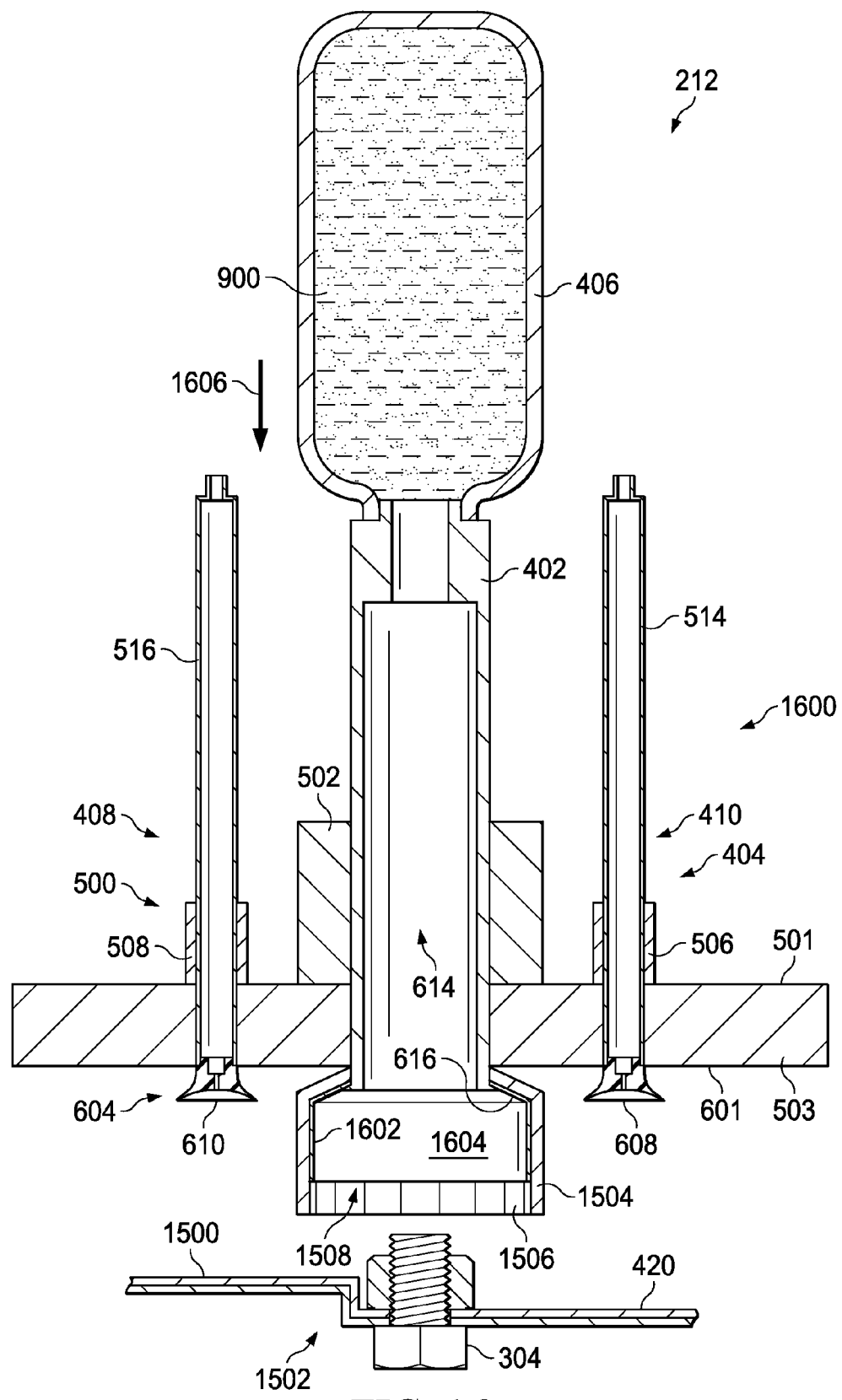
FIG. 16 is an illustration of a sealant applicator in a retracted position in accordance with an illustrative embodiment.

With reference to FIG. 16, an illustration of sealant applicator 212 in a retracted position is depicted in accordance with an illustrative embodiment. Sealant applicator 212 may begin in retracted position 1600, as described above. In this view, inner surface 1602 of shaping portion 1504 may be shown. Inner surface 1602 may have liner 1604. Liner 1604 may be another implementation for liner 152 in FIG. 1. Liner 1604 may line cavity 1508 of shaping portion 1504 such that sealant 900 may not pass between each of number of interlocking sections 1506 and centering portion 402. In other words, liner 1604 may substantially prevent leakage of sealant 900.

In one example, liner 1604 may be configured to cover substantially all of inner surface 1602 of shaping portion 1504. In this illustrative example, liner 1604 may partially cover inner surface 1602 of shaping portion 1504.

As illustrated, centering portion 402 and shaping portion 1504 may be configured to move toward uneven surface 1502 of object 1500. Centering portion 402 and shaping portion 1504 may move in the direction of arrow 1606.

Figure 17:
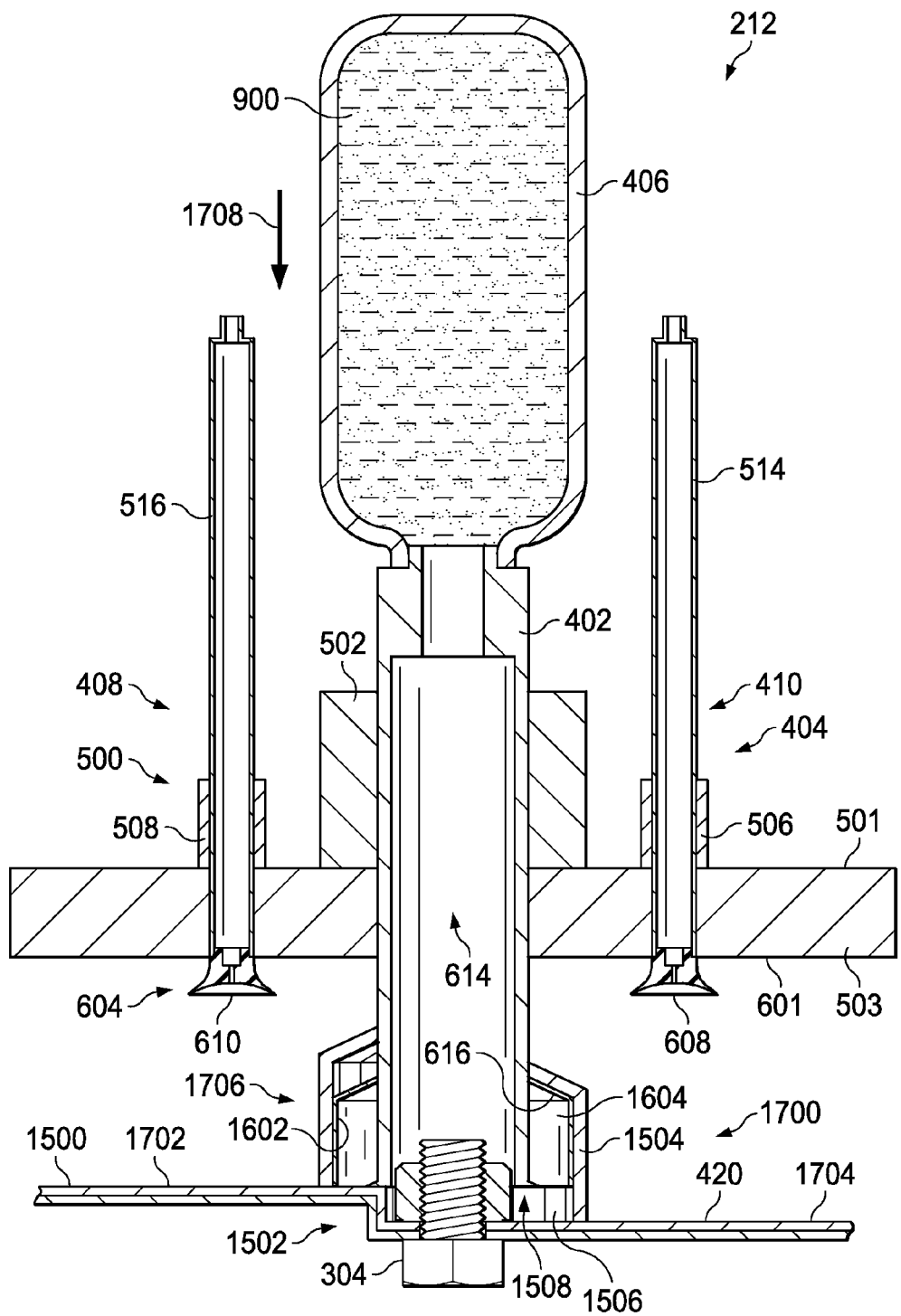
FIG. 17 is an illustration of a centering portion in an extended position in accordance with an illustrative embodiment.

In FIG. 17, an illustration of centering portion 402 in an extended position is depicted in accordance with an illustrative embodiment. Centering portion 402 may have been moved in the direction of arrow 1606 in FIG. 16 to extended position 1700. In extended position 1700, interlocking base section 616 may be substantially flush with uneven surface 1502 of object 1500 on one side of fastener 304. As a result of centering portion 402 being moved to extended position 1700, some of number of interlocking sections 1506 may fall to first height 1702 of uneven surface 1502, while others of number of interlocking sections 1506 may fall to second height 1704 of uneven surface 1502. In other words, some of number of interlocking sections 1506 may be at different heights, depending on the contour of uneven surface 1502. In this manner, number of interlocking sections 1506 may provide sealant applicator 212 with the ability to seal fastener 304 on uneven surface 1502 in a desired manner.

In this example, liner 1604 on inner surface 1602 of shaping portion 1504 may move to rest on first height 1702 of uneven surface 1502. In some examples, liner 1604 may completely cover inner surface 1602 such that sealant 900 may not reach number of interlocking sections 1506. In this instance, liner 1604 also may be sectioned.

With this configuration of shaping portion 1504 with number of interlocking sections 1506, sealant 900 may flow into cavity 1508 such that leakage of sealant 900 may be reduced. The reduction may result in an absence of a leakage of sealant 900.

As depicted, centering portion 402 may be configured to center fastener 304 in cavity 1508 of shaping portion 1504. In these depicted examples, centering portion 402 may be configured to place shaping portion 1504 in desired position 1706 about fastener 304. Desired position 1706 may be another example of one implementation for desired position 158 in FIG. 1. In particular, desired position 1706 may be selected such that sealant 900 may be applied to fastener 304 in a desired manner.

In this example, support system 404 with number of support elements 410 may not move as centering portion 402 moves. Support system 404 may be configured to move in the direction of arrow 1708, as shown in FIG. 18.

Figure 18:
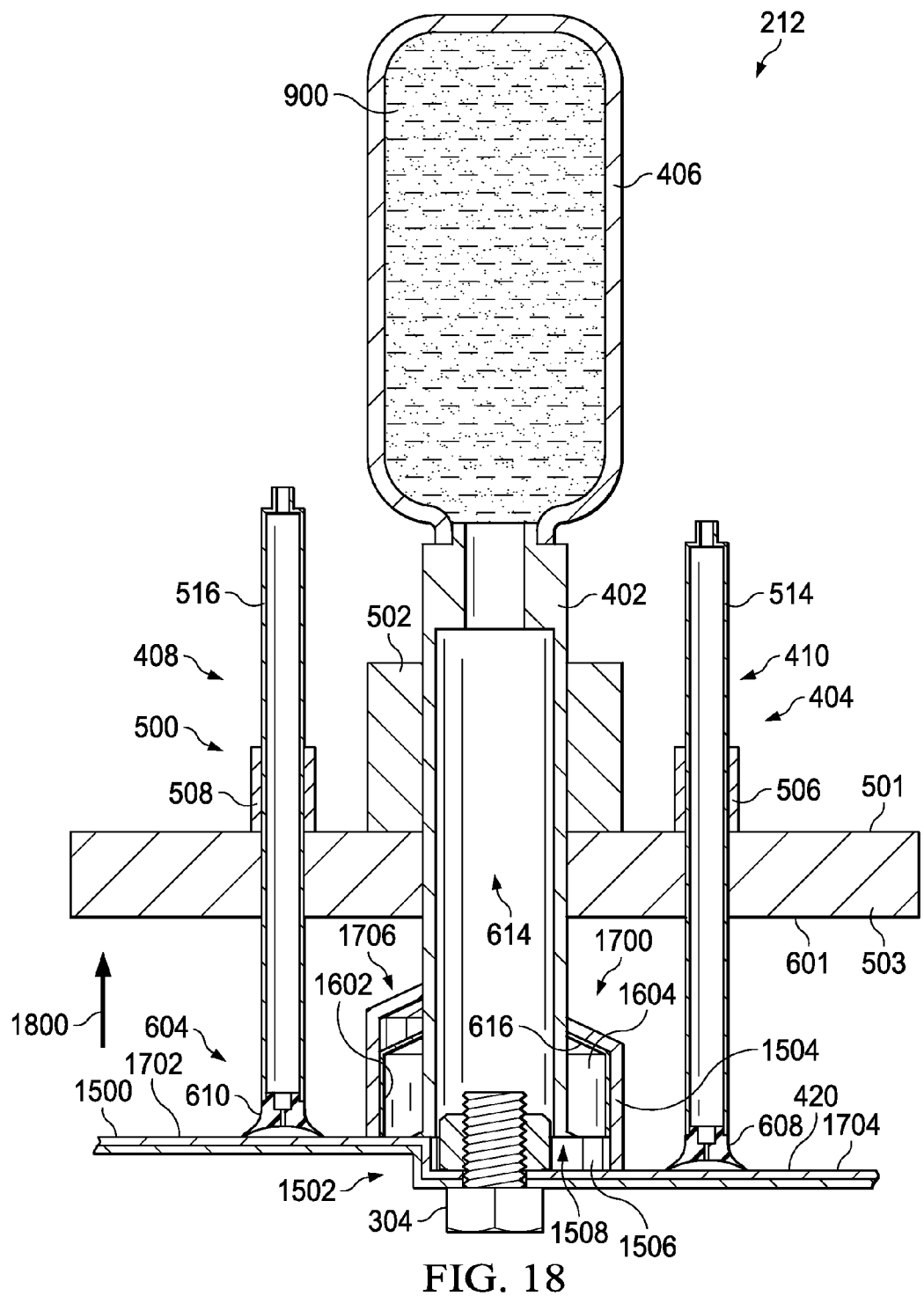
FIG. 18 is an illustration of a support system in an extended position in accordance with an illustrative embodiment.

Referring next to FIG. 18, an illustration of support system 404 in an extended position is depicted in accordance with an illustrative embodiment. Number of actuators 500 may have moved support system 404 toward surface 420 of object 1500 in the direction of arrow 1708 in FIG. 10. Number of support elements 410 with attachment portions 604 may then attach to uneven surface 1502 of object 1500 such that sealant applicator 212 may not move in an undesired manner during application of sealant 900 to fastener 304. In particular, in this example, support element 516 with attachment portion 610 may be configured to attach to first height 1702 of uneven surface 1502, while support element 518 with attachment portion 612, support element 512 with attachment portion 606, and support element 514 with attachment portion 608 may be configured to attach to second height 1704 of uneven surface 1502.

In this illustrative example, number of support elements 410 may move independently of each other. In some examples, centering portion 402 may then be configured to move upward, in the direction of arrow 1800, as shown in FIG. 19.

Figure 19:
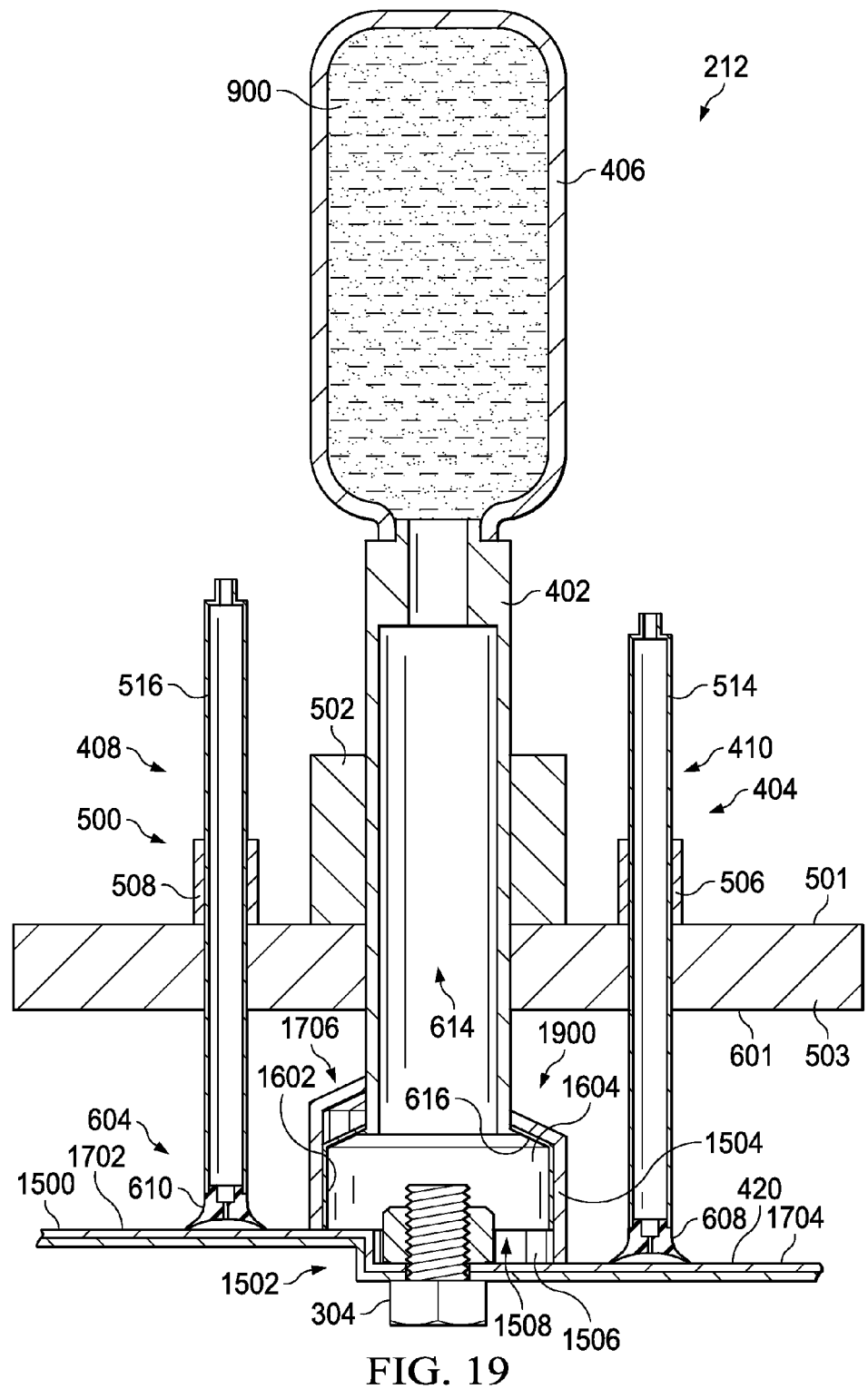
FIG. 19 is an illustration of a centering portion in a partially retracted position in accordance with an illustrative embodiment.

In FIG. 19, an illustration of centering portion 402 in a partially retracted position is depicted in accordance with an illustrative embodiment. Centering portion 402 may have been moved by actuator 502 in the direction of arrow 1800 in FIG. 18 to partially retracted position 1900. In the illustrative example, partially retracted position 1900 may be a position where interlocking base section 616 of centering portion 402 may engage with liner 1604 of inner surface 1602 of shaping portion 1504.

Partially retracted position 1900 also may be a position where interlocking base section 616 of centering portion 402 may engage with liner 1604 of inner surface 602 of shaping portion 1504 without moving number of interlocking sections 1506 away from uneven surface 420 of object 1500. In other words, number of interlocking sections 1506 may remain substantially flush with first height 1702 and second height 1704 of uneven surface 1502 when centering portion 402 may be in partially retracted position 1900 such that sealant 900 may not flow out of cavity 1508 in shaping portion 1504.

Figure 20:
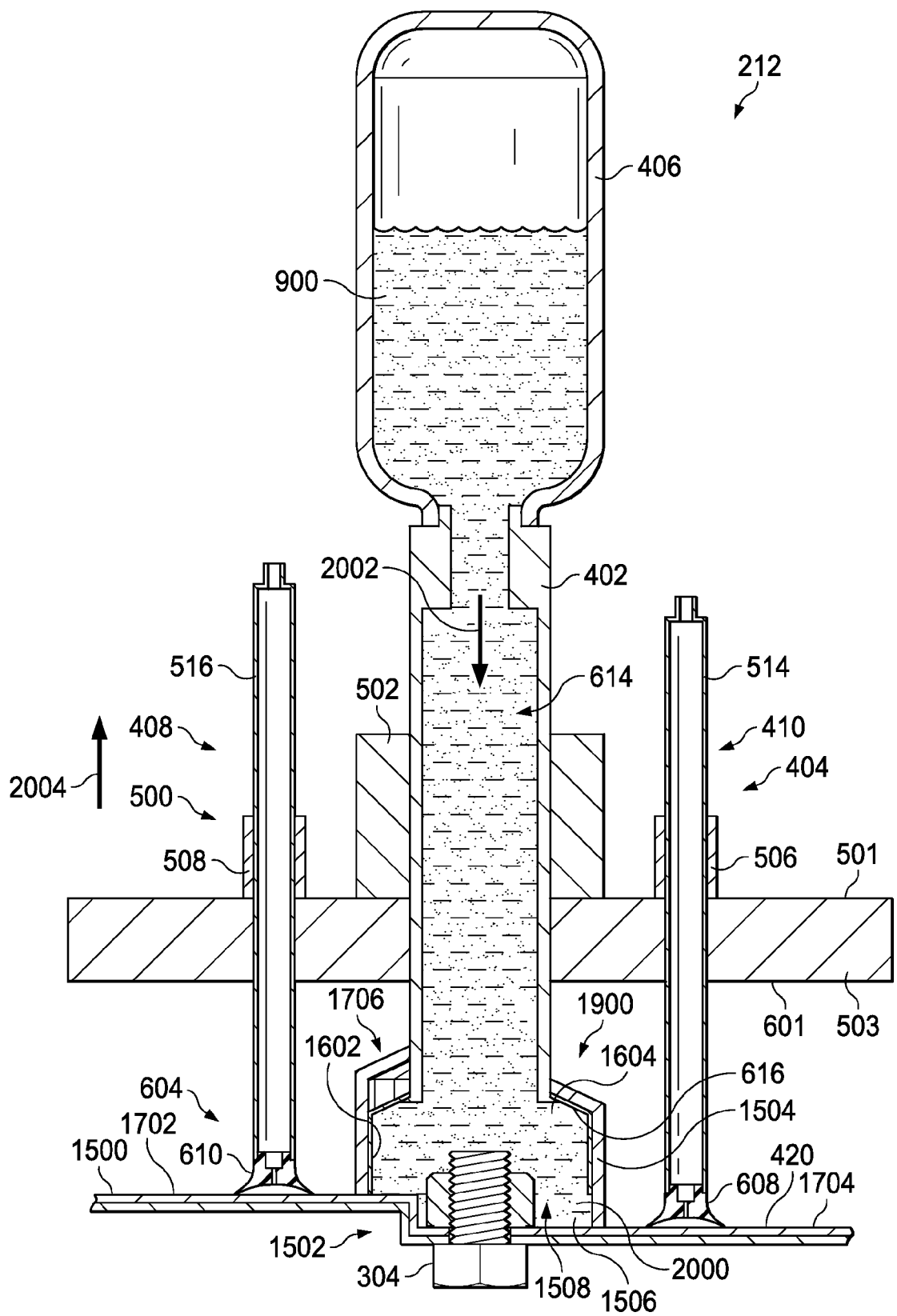
FIG. 20 is an illustration of a sealant applicator applying a sealant to a fastener in accordance with an illustrative embodiment.

Turning now to FIG. 20, an illustration of sealant applicator 212 applying sealant 900 to fastener 304 is depicted in accordance with an illustrative embodiment. Sealant 900 may be delivered to cavity 1508 in shaping portion 1504 through channel 614 in centering portion 402 to form layer of sealant 2000. In particular, sealant 900 may flow in the direction of arrow 2002 through channel 614 in centering portion 402. In these examples, layer of sealant 2000 may be one example of an implementation for layer of sealant 114 in FIG. 1.

After sealant 900 may form layer of sealant 2000, centering portion 402 and shaping portion 1504 with number of interlocking sections 1506 may be retracted. For instance, centering portion 402 and shaping portion 1504 may move in the direction of arrow 2004.

Figure 21:
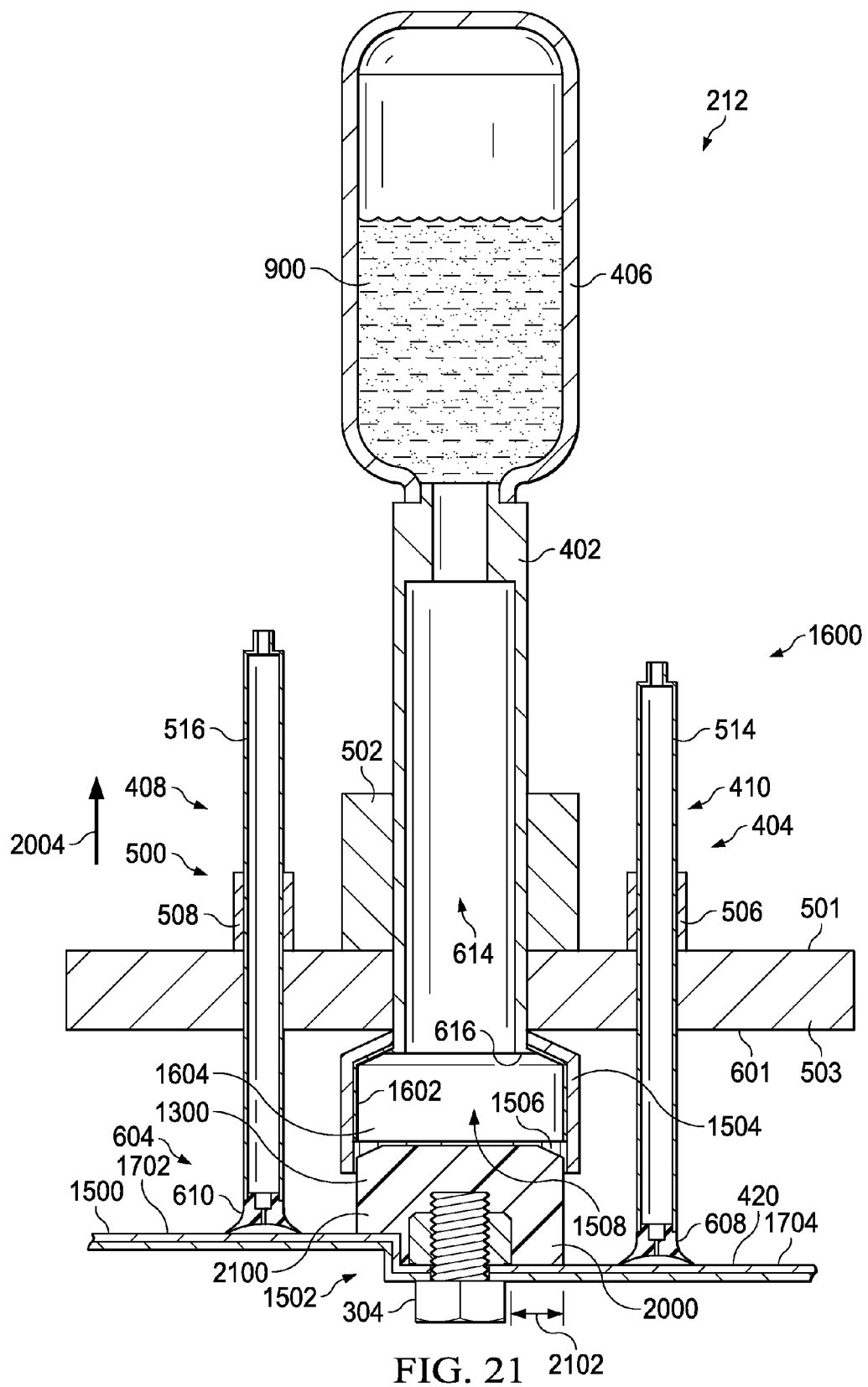
FIG. 21 is an illustration of a sealant applicator forming a layer of sealant over a fastener in accordance with an illustrative embodiment.

In FIG. 21, an illustration of sealant applicator 212 forming layer of sealant 1300 over fastener 304 is depicted in accordance with an illustrative embodiment. Centering portion 402 may have been moved in the direction of arrow 2004 in FIG. 20 back to retracted position 1600. In this illustrative example, shaping portion 1504 with number of interlocking sections 1506 may move upward with centering portion 402 when centering portion 402 may be retracted.

As illustrated, support system 404 with number of support elements 410 may remain in extended position 1700 (as seen in FIG. 17) as centering portion 402 may be retracted. As a result, centering portion 402 and shaping portion 1504 may not retract from fastener 304 with layer of sealant 2000 unevenly. Accordingly, seal cap 2100 may be formed with desired thickness 2102 over fastener 304. Desired thickness 2102 may be one example of an implementation for desired thickness 142 in FIG. 1. Desired thickness 2102 may be uniform thickness 144 in FIG. 1. In this example, desired thickness 2102 may be a desired thickness on both first height 1702 and second height 1704 of uneven surface 1502 such that seal cap 2100 covers and seals fastener 304 in a desired manner.

With the use of sealant applicator 212, layer of sealant 2000 may be applied to fastener 304 in a desired manner to have desired thickness 2102. Because support system 404 may remain in place during removal of layer of sealant 2000 and fastener 304 from cavity 1508 of shaping portion 1504, removal of layer of sealant 2000 and fastener 304 from cavity 1508 of shaping portion 1504 may occur without substantially altering the shape, thickness, or size of layer of sealant 2000. As a result, seal cap 2100 for fastener 304 may be formed more quickly and efficiently and with less rework than with some currently used sealant applicators. Moreover, with the use of number of interlocking sections 1506, seal cap 2100 may be formed on uneven surface 1502 in a desired manner.

Figure 22:
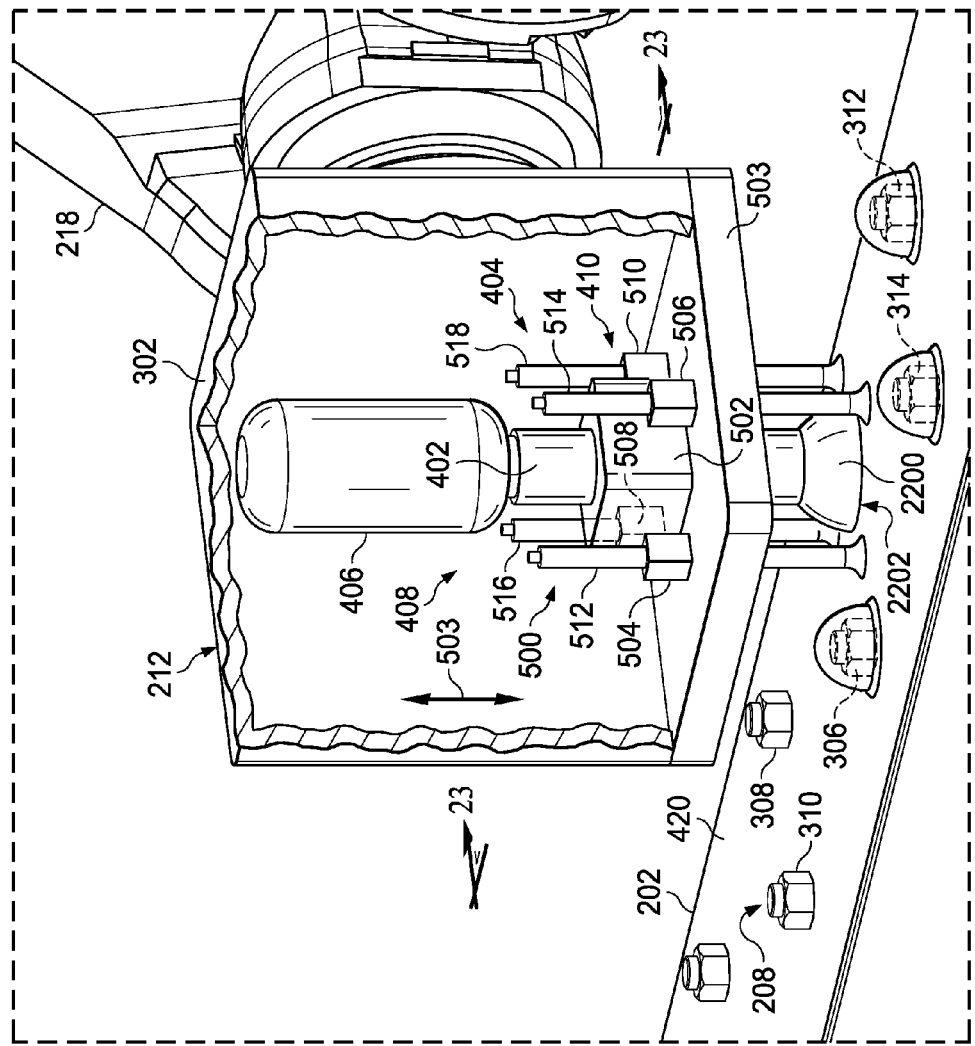
FIG. 22 is an illustration of a sealant applicator in accordance with an illustrative embodiment.

Referring now to FIG. 22, an illustration of sealant applicator 212 is depicted in accordance with an illustrative embodiment. In this example, sealant applicator 212 may be arranged over stringer 202, as described above.

In this view, shaping portion 400 of sealant applicator 212 may be replaced with shaping portion 2200. Shaping portion 2200 may have dome shape 2202 in this illustrative example. In other examples, shaping portion 2200 may have number of interlocking sections 1506 as seen in FIGS. 15-20.

Figure 23:
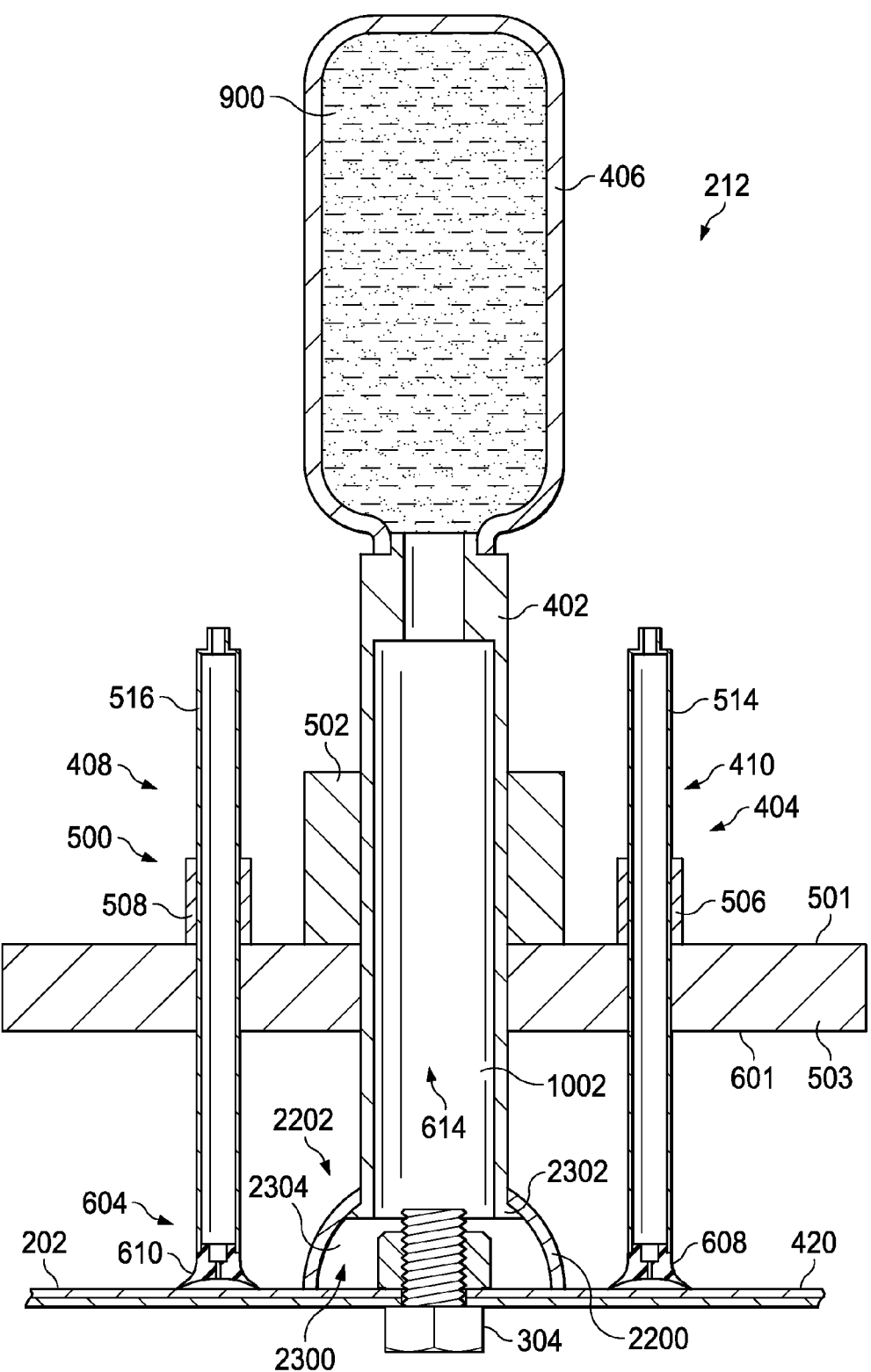
FIG. 23 is an illustration of a cross-sectional view of a shaping portion in accordance with an illustrative embodiment.

In FIG. 23, an illustration of a cross-sectional view of shaping portion 2200 taken along lines 23-23 from FIG. 22 is depicted in accordance with an illustrative embodiment. Cavity 2300 of shaping portion 2200 is shown. The shape of cavity 2300 may be substantially dome shape 2202. In this illustrative example, interlocking base section 2302 of centering portion 402 may have a different shape than interlocking base section 616 shown in FIGS. 6-14. In this example, interlocking base section 2302 may have a shape that may conform to dome shape 2202 of inner surface 2304 of shaping portion 2200 such that sealant may not leak out of shaping portion 2200.

Figure 24:
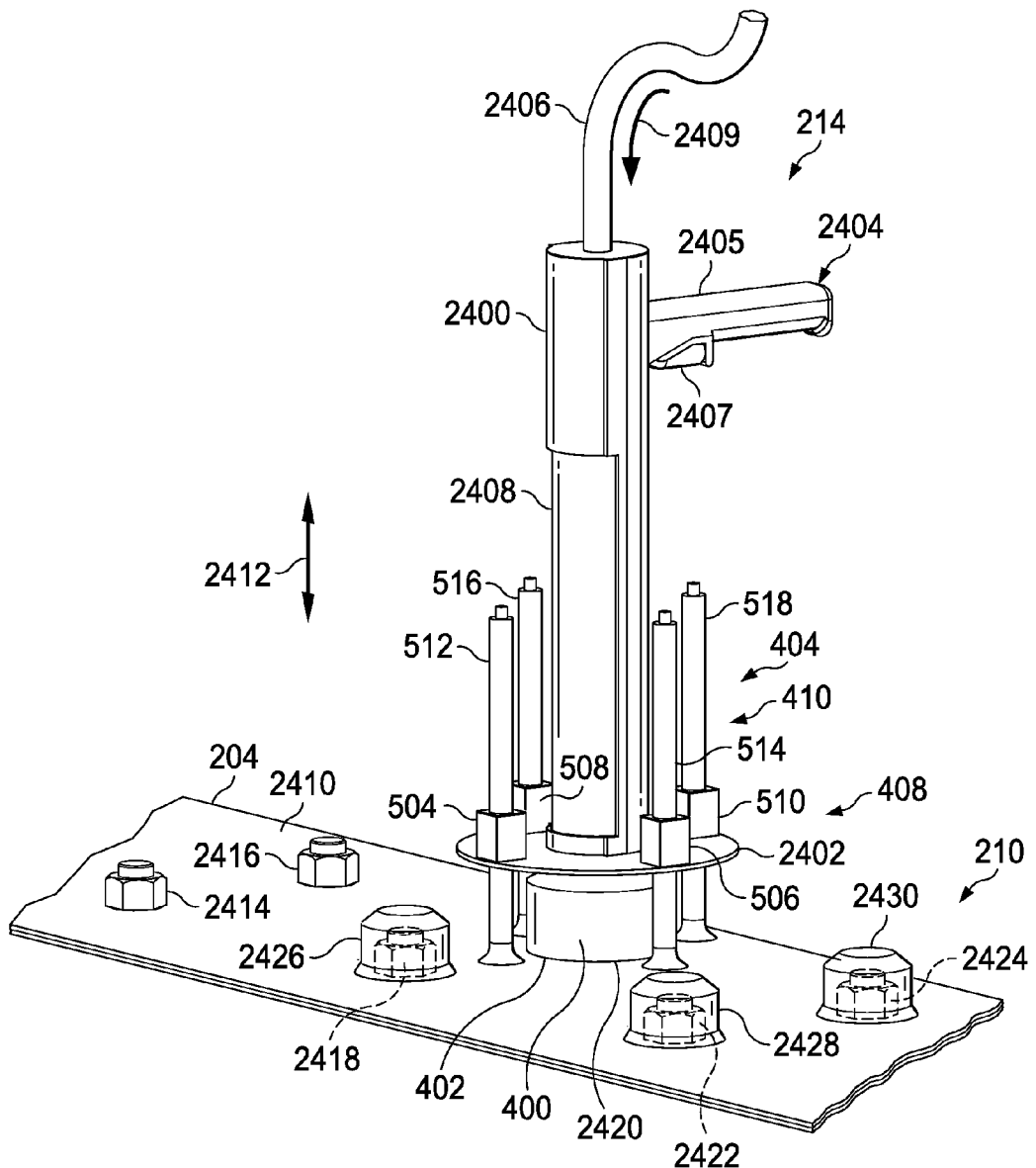
FIG. 24 is an illustration of a sealant applicator in accordance with an illustrative embodiment.

With reference to FIG. 24, an illustration of sealant applicator 214 from FIG. 2 is depicted in accordance with an illustrative embodiment. In this example, sealant applicator 214 is shown with respect to view lines 24-24 in FIG. 2. Sealant applicator 214 may be operated manually by human operator 220 from FIG. 2 to apply sealant 124 to number of fasteners 210 in this example.

As depicted, housing 302 in FIG. 3 has been replaced with housing 2400. Housing 2400 includes base portion 2402 and handheld device 2404. Handheld device 2404 may be one example of an implementation for handheld device 139 shown in block form in FIG. 1.

In this example, handheld device 2404 may include grip 2405 and trigger 2407. Grip 2405 may be configured such that human operator 220 may hold grip 2405 in a desired manner. Trigger 2407 may be a device that dispenses sealant 124. For example, without limitation, trigger 2407 may be one example of controller 137 shown in FIG. 1.

In this example, trigger 2407 may be a button. In other illustrative examples, trigger 2407 may be a different type of device, depending on the particular implementation.

As depicted, sealant applicator 214 may be configured to be a pneumatic device with air line 2406 physically attached to housing 2400. Automated pneumatic pressure from air line 2406 may apply a force to a plunger (not shown) in the direction of arrow 2409 to extrude sealant 124 from sealant cartridge 2408 when sealant cartridge 2408 is placed in housing 2400. Sealant cartridge 2408 may be one example of an implementation for sealant cartridge 176 in FIG. 1.

In this example, sealant applicator 214 may be configured to apply a desired level of pneumatic pressure to sealant 124 in sealant cartridge 2408. The pneumatic pressure may be adjusted based on the properties of the type of sealant 124 used by sealant applicator 214. This adjustment may be done automatically or manually.

In this illustrative example, sealant applicator 214 comprises similar elements to sealant applicator 212. In particular, sealant applicator 214 includes shaping portion 400, centering portion 402 (not shown), movement system 408, and number of support elements 410.

In operation, human operator 220 may position centering portion 402 over one of number of fasteners 210 on surface 2410 of stringer 204. Human operator 220 may then position shaping portion 400 such that shaping portion 400 is flush with surface 2410 of stringer 204. Movement system 408, human operator 220, or a combination of the two may position number of support elements 410 on surface 2410 of stringer 204 such that number of support elements 410 attach to surface 2410.

Human operator 220 may then manually pull centering portion 402 away from surface 2410 until centering portion 402 is in a partially retracted position. In this example, human operator 220 may push trigger 2407 to dispense sealant 124 from sealant cartridge 2408 using automated pneumatic force exerted on the plunger of sealant cartridge 2408 to extrude sealant 124. Once application of sealant 124 is complete, human operator 220 may pull sealant applicator 214 away from surface 2410 such that number of support elements 410 detach from surface 2410.

The alignment of centering portion 402 and shaping portion 400 over one of number of fasteners 210 may allow both even application of sealant 124 and even removal of sealant applicator 214 from surface 2410 of stringer 204. In this manner, human operator 220 operates sealant applicator 214 by moving sealant applicator 214 in the direction of arrow 2412 manually, thereby applying sealant 124 to fastener 2414, fastener 2416, fastener 2418, fastener 2420, fastener 2422, and fastener 2424 in number of fasteners 210. For example, without limitation, sealant applicator 214 may be used to form seal cap 2426, seal cap 2428, and seal cap 2430 in this illustrative example.

Figure 25:
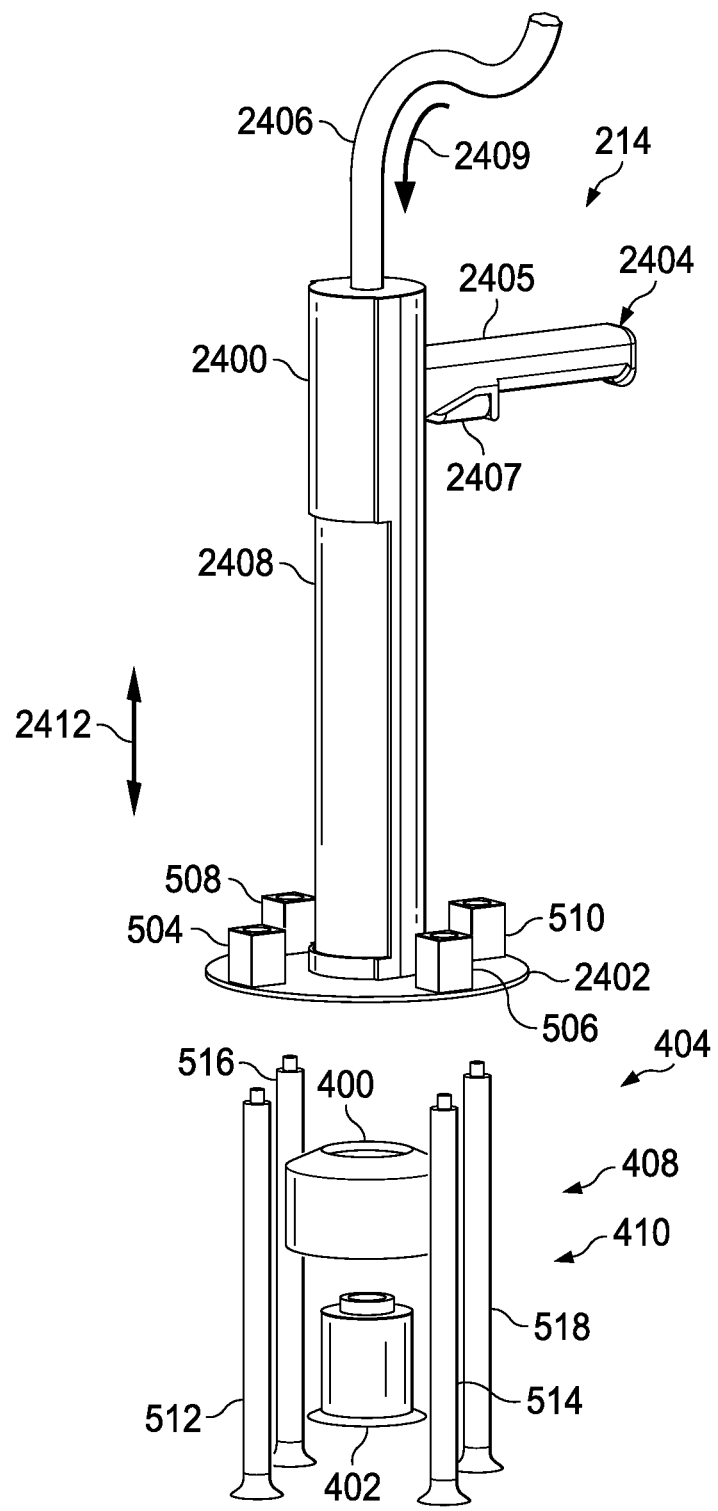
FIG. 25 is an illustration of an exploded view of a sealant applicator in accordance with an illustrative embodiment.

Referring next to FIG. 25, an illustration of an exploded view of sealant applicator 214 from FIG. 24 is depicted in accordance with an illustrative embodiment. In this view, a more detailed illustration of the components in sealant applicator 214 may be seen. These components may be similar to the components shown with respect to sealant applicator 212 shown in FIG. 6. These components operate as described above.

While sealant applicator 214 is shown in FIGS. 24 and 25 as having housing 2400 with grip 2405 and trigger 2407, this depiction is not meant to limit the manner in which a handheld sealant applicator may be configured. Other types of handheld devices may be used, housing 2400 may be absent from sealant applicator 214, sealant applicator 214 may include a different sealant source other than sealant cartridge 2408, or other desirable modifications may apply, depending on the functionality involved.

Figure 26:
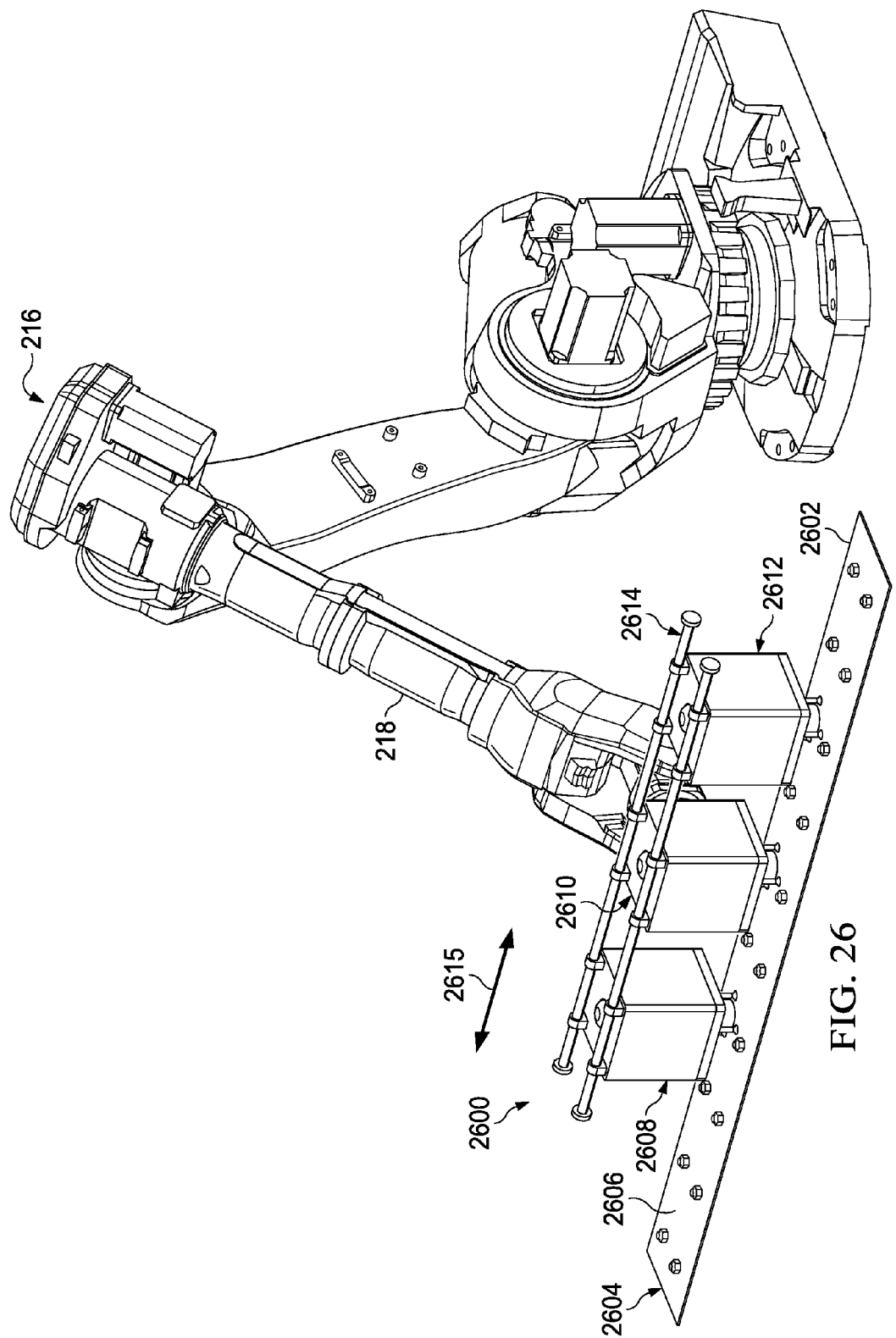
FIG. 26 is an illustration of a robotic device with an array of sealant applicators in accordance with an illustrative embodiment.

Referring next to FIG. 26, an illustration of a robotic device with an array of sealant applicators is depicted in accordance with an illustrative embodiment. Robotic device 216 with arm 218 from FIG. 2 is shown with a sealant applicator array arranged over an object. In this example, sealant applicator 212 may be replaced with sealant applicator array 2600 and arranged over number of fasteners 2604 along object 2602. Sealant applicator array 2600 may comprise sealant applicator 2608, sealant applicator 2610, and sealant applicator 2612, which may be examples of implementations for sealant applicator 128 in FIG. 1. Number of fasteners 2604 and object 2602 with surface 2606 may be an example of one implementation for number of fasteners 110 and object 102 with surface 150 in FIG. 1, respectively.

Rail system 2614 may attach sealant applicator 2608, sealant applicator 2610, and sealant applicator 2612 with each other. Rail system 2614 may be only one example of a system for attaching sealant applicator 2608, sealant applicator 2610, and sealant applicator 2612 with each other. Tracks or other suitable types of movement devices also may be used in other illustrative examples.

In one example, sealant applicator 2608, sealant applicator 2610, and sealant applicator 2612 may move relative to one another along rail system 2614 in the direction of arrow 2615 to adjust for different sizes and distances between number of fasteners 2604. Sealant applicator 2608, sealant applicator 2610, and sealant applicator 2612 may operate similar to sealant applicator 212, as described herein.

In this manner, multiple of number of fasteners 2604 may be covered and sealed at substantially the same time. As a result, sealant applicator array 2600 may increase the efficiency and reduce the rework of the sealant application process.

The different components shown in FIGS. 2-26 may be illustrative examples of how components shown in block form in FIG. 1 can be implemented as physical structures. Additionally, some of the components in FIGS. 2-26 may be combined with components in FIG. 1, used with components in FIG. 1, or a combination of the two.

Figure 27:
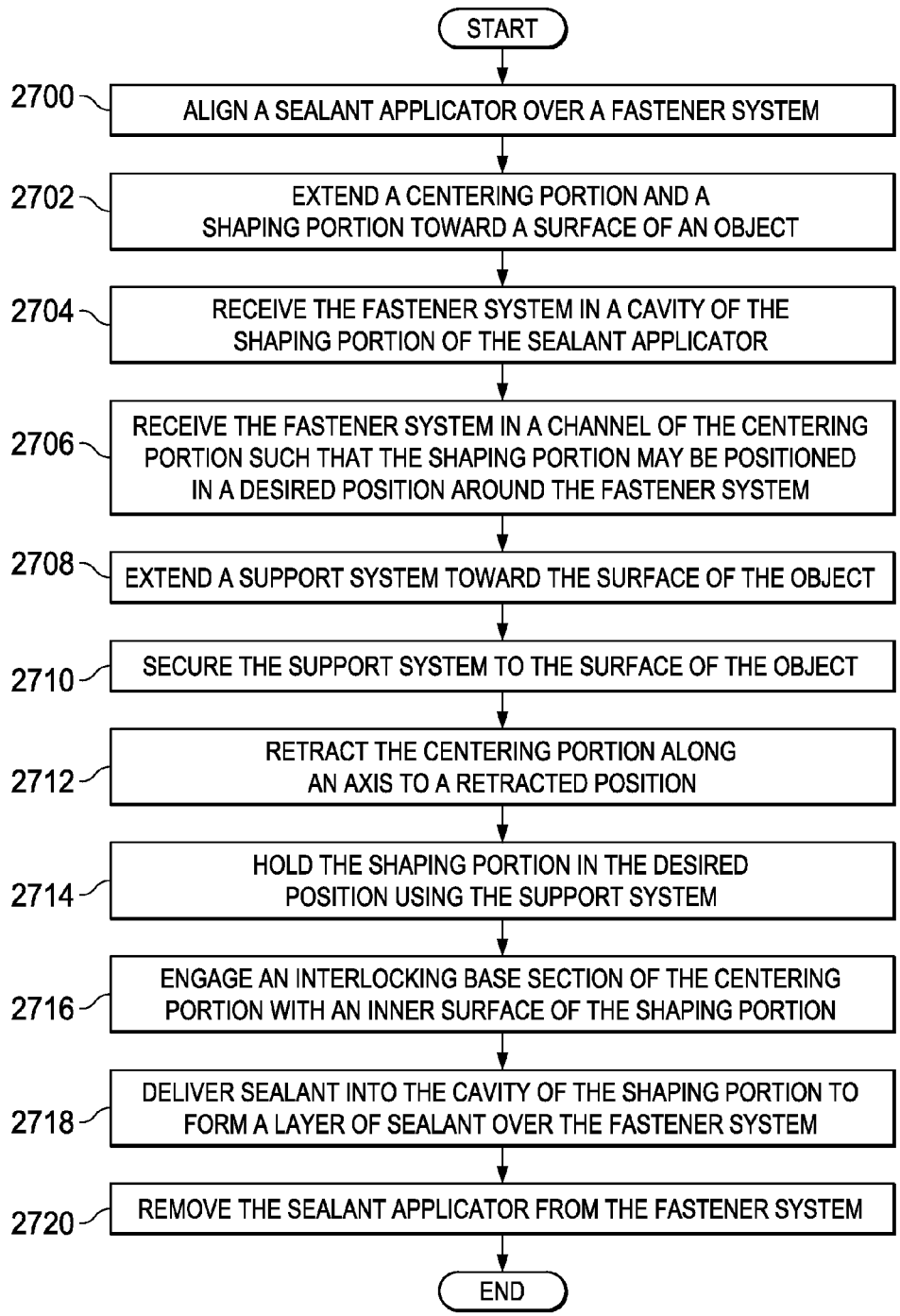
FIG. 27 is an illustration of a flowchart of a process for applying sealant to a fastener system in accordance with an illustrative embodiment.

With reference now to FIG. 27, an illustration of a flowchart of a process for applying sealant to a fastener system is depicted in accordance with an illustrative embodiment. The process illustrated in FIG. 27 may be implemented by sealant applicator 128 to form, for example, without limitation, layer of sealant 114 over fastener 116 on surface 150 of object 102 in FIG. 1.

The process may begin by aligning sealant applicator 128 over fastener system 108 (operation 2700). Next, centering portion 132 and shaping portion 130 may be extended toward surface 150 of object 102 (operation 2702).

Next, the process may receive fastener system 108 in cavity 138 of shaping portion 130 of sealant applicator 128 (operation 2704). Fastener system 108 may then be received in channel 154 of centering portion 132 such that shaping portion 130 may be positioned in desired position 158 around fastener system 108 (operation 2706). In particular, centering portion 132 may move along axis 164 to extended position 160 to receive fastener 116 in fastener system 108.

Thereafter, support system 134 may be extended toward surface 150 of object 102 (operation 2708). Support system 134 may then be secured to surface 150 of object 102 (operation 2710). In this illustrative example, each of number of support elements 170 may be attached to surface 150 of object 102. When shaping portion 130 comprises number of interlocking sections 146, some of number of interlocking sections 146 may attach to different heights of surface 150, depending on the particular implementation.

Centering portion 132 may be retracted along axis 164 to retracted position 162 (operation 2712). Shaping portion 130 may be held in desired position 158 using support system 134 (operation 2714). For example, without limitation, shaping portion 130 may be held in desired position 158 by support system 404 while centering portion 132 may be retracted by actuator 502 to partially retracted position 1200.

Next, interlocking base section 166 of centering portion 132 may be engaged with inner surface 168 of shaping portion 130 (operation 2716). Sealant 124 may be delivered into cavity 138 of shaping portion 130 to form layer of sealant 114 over fastener system 108 (operation 2718). Thereafter, sealant applicator 128 is removed from fastener system 108 (operation 2720) and the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, without limitation, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Illustrative embodiments of the disclosure may be described in the context of aircraft manufacturing and service method 2800 as shown in FIG. 28 and aircraft 2900 as shown in FIG. 29. Turning first to FIG. 28, an illustration of an aircraft manufacturing and service method is depicted in accordance with an illustrative embodiment. During pre-production, aircraft manufacturing and service method 2800 may include specification and design 2802 of aircraft 2900 in FIG. 29 and material procurement 2804.

During production, component and subassembly manufacturing 2806 and system integration 2808 of aircraft 2900 in FIG. 29 takes place. Thereafter, aircraft 2900 in FIG. 29 may go through certification and delivery 2810 in order to be placed in service 2812. While in service 2812 by a customer, aircraft 2900 in FIG. 29 is scheduled for routine maintenance and service 2814, which may include modification, reconfiguration, refurbishment, and other maintenance or service.

Each of the processes of aircraft manufacturing and service method 2800 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 29, an illustration of an aircraft is depicted in which an illustrative embodiment may be implemented. In this example, aircraft 2900 is produced by aircraft manufacturing and service method 2800 in FIG. 28 and may include airframe 2902 with plurality of systems 2904 and interior 2906. Examples of systems 2904 include one or more of propulsion system 2908, electrical system 2910, hydraulic system 2912, and environmental system 2914. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2800 in FIG. 28. In particular, layer of sealant 114 from FIG. 1 may be applied during any one of the stages of aircraft manufacturing and service method 2800. For example, without limitation, sealant applicator 128 from FIG. 1 may be used to apply layer of sealant 114 to fastener 116 during at least one of component and subassembly manufacturing 2806, system integration 2808, routine maintenance and service 2814, or some other stage of aircraft manufacturing and service method 2800.

In one illustrative example, components or subassemblies produced in component and subassembly manufacturing 2806 in FIG. 28 may be fabricated or manufactured in a manner similar to components or subassemblies produced while aircraft 2900 is in service 2812 in FIG. 28. As yet another example, one or more apparatus embodiments, method embodiments, or a combination thereof may be utilized during production stages, such as component and subassembly manufacturing 2806 and system integration 2808 in FIG. 28. One or more apparatus embodiments, method embodiments, or a combination thereof may be utilized while aircraft 2900 is in service 2812 and/or during maintenance and service 2814 in FIG. 28. The use of a number of the different illustrative embodiments may substantially expedite the assembly of and/or reduce the cost of aircraft 2900.

Thus, the illustrative embodiments may provide a method and apparatus for applying sealant 124 to fastener system 108. In one illustrative embodiment, sealant applicator 128 may comprise shaping portion 130, centering portion 132, and support system 134. Shaping portion 130 may have cavity 138 and may be configured to receive fastener system 108. Shaping portion 130 may be further configured to receive sealant 124 within cavity 138 to form layer of sealant 114 over fastener system 108 within cavity 138. Centering portion 132 may be moveably located within cavity 138 of shaping portion 130 and may have channel 154. Centering portion 132 may be configured to position shaping portion 130 in desired position 158 around fastener system 108 when fastener system 108 is received in cavity 138. Centering portion 132 may be further configured to deliver sealant 124 into cavity 138 of shaping portion 130. Support system 134 may be physically associated with shaping portion 130. Support system 134 may be configured to hold shaping portion 130 in desired position 158 when sealant 124 flows into cavity 138 to form layer of sealant 114.

With the use of an illustrative embodiment, layer of sealant 114 may be applied with desired thickness 142. Desired thickness 142 may stay substantially the same during all phases of application with the use of an illustrative embodiment. In this manner, embodiments of the present disclosure may provide efficient and cost effective sealant application. Additionally, fewer of number of fasteners 110 in fastener system 108 may have to be reworked.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a shaping portion having a cavity configured to receive a fastener system and receive a sealant;
a centering portion having a channel configured to position the shaping portion in a position around the fastener system when the fastener system is received in the cavity; and
a support system comprising a number of support elements configured to secure the shaping portion and the centering portion to a surface of an object in which the fastener system is installed when receiving the fastener system, applying a layer of sealant to the fastener system, and retracting from the fastener system;
wherein the sealant received in the cavity of the shaping portion forms the layer of sealant over the fastener system within the cavity; and
wherein the shaping portion, the centering portion, and the support system form at least one of a sealant applicator or an automatic sealant applicator, and a thickness of the layer of sealant stays substantially the same during all phases of application and removal of the sealant applicator or the automatic sealant applicator.

2. The apparatus of claim 1, wherein the centering portion is concentrically located within the cavity of the shaping portion and is further configured to moveably retract within the cavity of the shaping portion during delivery of the sealant.

3. The apparatus of claim 2, wherein the support system is physically associated with the shaping portion and the centering portion and is configured to maintain a position of the apparatus relative to fastener system when the centering portion and the shaping portion retract to form the layer of sealant over the fastener system.

4. The apparatus of claim 1, wherein the support system remains in place during removal of the layer of sealant and the fastener system from the cavity of the shaping portion so that removal of the layer of sealant and the fastener system from the cavity of the shaping portion occurs without substantially altering a shape, the thickness, or a size of the layer of sealant.

5. The apparatus of claim 2, wherein the centering portion is configured to move within the cavity of the shaping portion between an extended position and a retracted position; to position the shaping portion in the position around the fastener system when the centering portion is in the extended position; and to deliver the sealant into the cavity when the centering portion is moved into the retracted position.

6. The apparatus of claim 5, wherein the centering portion is configured to receive the fastener system in the channel when in the extended position within the cavity of the shaping portion and move the fastener system out of the channel when in the retracted position within the cavity of the shaping portion.

7. The apparatus of claim 6, wherein the centering portion is configured to move along an axis extending centrally through the fastener system when moving within the cavity of the shaping portion between the extended position and the retracted position.

8. The apparatus of claim 5, wherein the centering portion comprises:
an interlocking base section configured to engage with an inner surface in the cavity of the shaping portion when the centering portion is in the retracted position.

9. The apparatus of claim 5, wherein the cavity in the shaping portion is configured to cause the sealant to form the layer of sealant having a thickness corresponding to the retracted position of the centering portion.

10. The apparatus of claim 1, wherein the shaping portion comprises a plurality of interlocking sections.

11. The apparatus of claim 10, wherein the plurality of interlocking sections is configured to seal the shaping portion against an uneven surface around the fastener system.

12. The apparatus of claim 11, wherein each of the plurality of interlocking sections is configured to move independently of others of the plurality of interlocking sections.

13. The apparatus of claim 1, wherein the support system is configured to maintain a radial position of the centering portion relative to the fastener system as the centering portion moves between an extended position and a retracted position, and to maintain the radial position of the shaping portion as the shaping portion is removed from the fastener system.

14. The apparatus of claim 1, wherein the support system is selected from at least one of a vacuum sealing device, a magnet clamping system, a lock, a clip, a track, a mechanical relative position location device, or a robotic arm.

15. An apparatus comprising:
a shaping portion having a cavity and a number of interlocking sections configured to move independently of other interlocking sections, in which the shaping portion is configured to:
receive a fastener system in the cavity; and
receive a sealant within the cavity to form a layer of sealant over the fastener system;
a centering portion moveably located within the cavity of the shaping portion and having a channel and an interlocking base section, in which the centering portion is configured to:
position the shaping portion in a position around the fastener system when the fastener system is received in the cavity;
move between an extended position and a retracted position such that the shaping portion is in the position around the fastener system when the centering portion is in the extended position, in which the centering portion moves along an axis extending centrally through the fastener system when moving between the extended position and the retracted position;
receive the fastener system in the channel when in the extended position and move the fastener system out of the channel when in the retracted position, in which the interlocking base section is configured to engage with an inner surface in the cavity of the shaping portion when the centering portion is in the retracted position; and
deliver the sealant into the cavity of the shaping portion when the centering portion is in the retracted position to form the layer of sealant with a thickness corresponding to the retracted position of the centering portion; and a support system physically associated with the shaping portion and the centering portion selected from at least one of a vacuum sealing device, a magnet clamping system, a lock, a clip, a track, a mechanical relative position location device, or a robotic arm, the support system comprising a number of support elements configured to secure the number of support elements to a surface of an object in which the fastener system is installed, in which the support system is configured to:

hold the apparatus in the position when the centering portion and the shaping portion retract to form the layer of sealant over the fastener system;

maintain the position of the centering portion as the centering portion moves between the extended position and the retracted position; and maintain the position of the shaping portion as the shaping portion is removed from the fastener system, in which the shaping portion, the centering portion, and the support system form one of a sealant applicator or an automatic sealant applicator wherein the number of support elements are configured to secure the shaping portion and the centering portion to the surface of the object in which the fastener system is installed when receiving the fastener system, applying the layer of sealant to the fastener system, and retracting from the fastener system; and wherein the shaping portion, the centering portion, and the support system form at least one of the sealant applicator or the automatic sealant applicator, and wherein the thickness of the layer of sealant stays substantially the same during all phases of application and removal of the sealant applicator or the automatic sealant applicator.

* * * * *